(12) United States Patent
Shinkai et al.

(10) Patent No.: US 8,326,113 B2
(45) Date of Patent: Dec. 4, 2012

(54) RECORDING APPARATUS AND RECORDING METHOD, PROGRAM, AND RECORDING SYSTEM

(75) Inventors: Mitsutoshi Shinkai, Kanagawa (JP); Akimitsu Hio, Tokyo (JP)

(73) Assignee: Sony Corporation, Tokyo (JP)

( * ) Notice: Subject to any disclaimer, the term of this patent is extended or adjusted under 35 U.S.C. 154(b) by 739 days.

(21) Appl. No.: 12/257,055

(22) Filed: Oct. 23, 2008

(65) Prior Publication Data

US 2009/0123134 A1 May 14, 2009

(30) Foreign Application Priority Data

Nov. 9, 2007 (JP) .................................. 2007-291574

(51) Int. Cl.
*H04N 5/77* (2006.01)
(52) U.S. Cl. .................... 386/224; 386/210; 386/200
(58) Field of Classification Search .................... None
See application file for complete search history.

(56) References Cited

U.S. PATENT DOCUMENTS

| | | | |
|---|---|---|---|
| 2004/0212832 A1* | 10/2004 | Shibata | 358/1.16 |
| 2006/0239642 A1* | 10/2006 | Yuasa et al. | 386/83 |
| 2007/0121153 A1 | 5/2007 | Shinkai | |
| 2007/0135931 A1* | 6/2007 | Doi et al. | 700/11 |
| 2007/0201864 A1* | 8/2007 | Shinkai et al. | 396/429 |

FOREIGN PATENT DOCUMENTS

| | | |
|---|---|---|
| JP | 2004-172780 | 6/2004 |
| JP | 2005-311563 | 11/2005 |
| JP | 2006-114985 | 4/2006 |
| JP | 2006-287876 | 10/2006 |
| JP | 2007-34386 | 2/2007 |
| JP | 2007-150781 | 6/2007 |

OTHER PUBLICATIONS

Office Action issued Oct. 25, 2011, in Japanese Patent Application No. 2007-291574.

* cited by examiner

*Primary Examiner* — William C Vaughn, Jr.
*Assistant Examiner* — Eileen Adams
(74) *Attorney, Agent, or Firm* — Oblon, Spivak, McClelland, Maier & Neustadt, L.L.P.

(57) ABSTRACT

A first recording apparatus acquires first data and records the first data in a first recording unit, transmits to a second recording apparatus first priority information which is information relating to priority data representing priority of recording the first data to the second recording apparatus, receives second priority information which is information relating to priority data representing priority of recording second data acquired at the second recording apparatus which is transmitted from the second recording apparatus, determines priority data of the first recording apparatus and the second recording apparatus, based on the first priority information and the second priority information, and transfers the first data to the second recording apparatus, based on the priority data of the second recording apparatus, if the recording capacity of the first recording unit falls below a stipulation value corresponding to the priority data of the first recording apparatus.

11 Claims, 18 Drawing Sheets

FIG. 8

PRIORITY LIST [EXIT]
CAMERA4 (XXX. XXX. XXX. 004) :L -- > H?
CAMERA1 (XXX. XXX. XXX. 002) :L
CAMERA2 (XXX. XXX. XXX. 003) :H
CAMERA3 (XXX. XXX. XXX. 001) :L

FIG. 9

PRIORITY LIST [EXIT]
CAMERA4 (XXX. XXX. XXX. 004) :L -- > H;OK
CAMERA1 (XXX. XXX. XXX. 002) :L
CAMERA2 (XXX. XXX. XXX. 003) :H
CAMERA3 (XXX. XXX. XXX. 001) :L

FIG. 10

PRIORITY LIST [[EXIT]]
CAMERA4 (XXX. XXX. XXX. 004) :H -- > L?
CAMERA1 (XXX. XXX. XXX. 002) :L
CAMERA2 (XXX. XXX. XXX. 003) :L
CAMERA3 (XXX. XXX. XXX. 001) :L

FIG. 12

PRIORITY LIST [EXIT]
CAMERA2 (XXX. XXX. XXX. 002) :H - - > L?
CAMERA1 (XXX. XXX. XXX. 001) :L
CAMERA3 (XXX. XXX. XXX. 003) :L         102
CAMERA4 (XXX. XXX. XXX. 004) :L - - > H;OK?
                              :L - - > H;NG?

102
PRIORITY LIST [EXIT]
CAMERA2 (XXX. XXX. XXX. 002) :L - - > H?
CAMERA1 (XXX. XXX. XXX. 001) :L
CAMERA3 (XXX. XXX. XXX. 003) :L
CAMERA4 (XXX. XXX. XXX. 004) :H

101

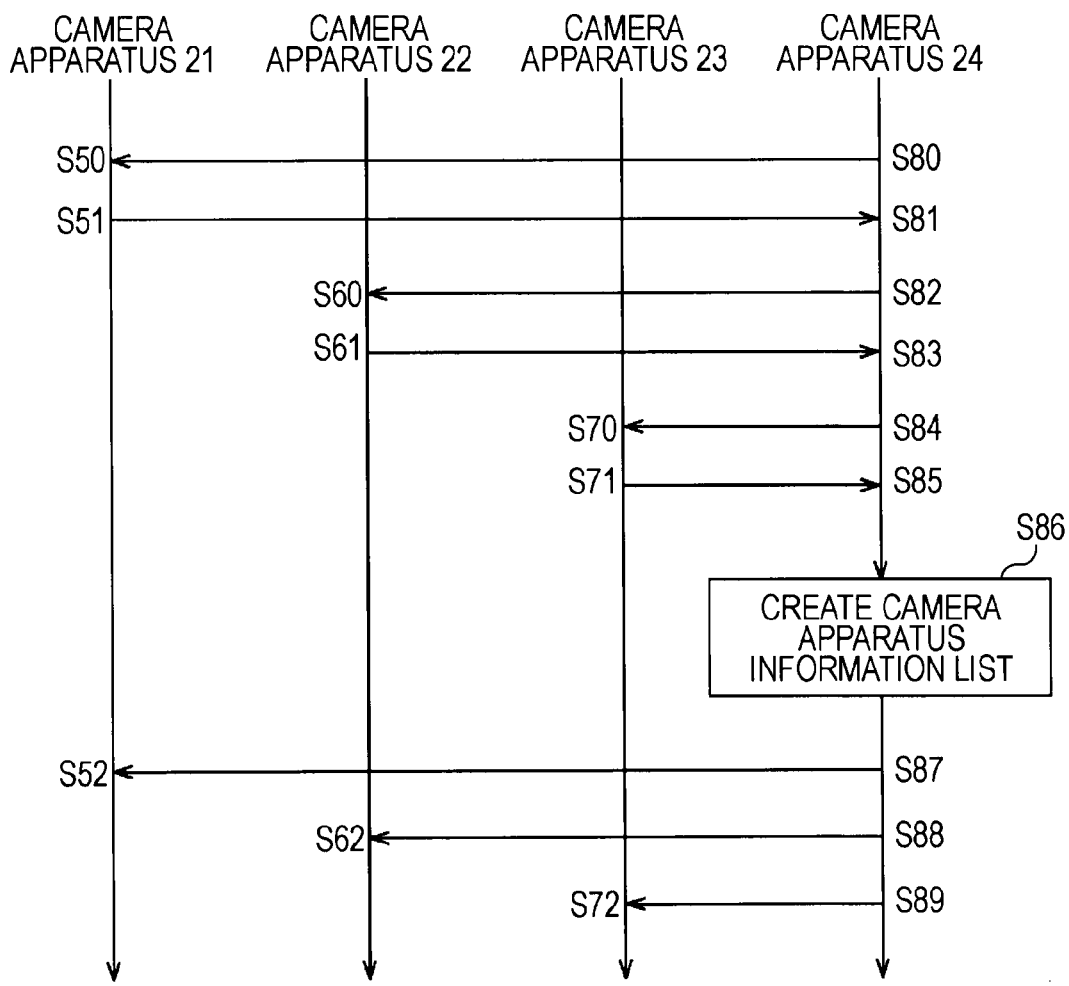

FIG. 18

```
1: <?xml version="1.0" encoding="UTF-8"?>
2: <NonRealTimeMeta xmlns="urn:schemas-professionalDisc:nonRealTimeMeta"
3:      lastUpdate="2007-08-01T14:12:56+09:00">
4:   <TargetMaterial
5:    umidRef="060A2B34010105010D12130000000000010444484EEEE00E0188E130B"
6:    status="OK"/>
7:   <TransferMediaId value="20070101"/>
8:   <TransferDate value="2007-08-01T14:12:56+09:00"/>
9:   <Duration value="9000"/>
10:  <CreationDate value="2007-08-01T12:34:56+09:00"/>
11:  <Title usAscii="The Prime Minister organized a new Cabinet">
12:  </Title>
13: </NonRealTimeMeta>
```

FIG. 19

```
 1: <?xml version="1.0" encoding="UTF-8"?>
 2: <NonRealTimeMeta xmlns="urn:schemas-professionalDisc:nonRealTimeMeta"
 3:       lastUpdate="2007-08-01T12:34:56+09:00">
 4:    <TargetMaterial
 5:      umidRef="060A2B340101010501010D12130000000000010444444484EEEE00E0188E130B"
 6:      status="OK"/>
 7:    <Divide
 8:      umidRef="060A2B340101010501010D1213000000524728714444444484EEEE00E0188E130B"/>
 9:    <Duration value="9000"/>
10:    <CreationDate value="2007-08-01T12:34:56+09:00"/>
11:    <Title usAscii="The Prime Minister organized a new Cabinet">
12:    </Title>
13: </NonRealTimeMeta>
```

FIG. 20

```
1: <?xml version="1.0"encoding="UTF-8"?>
2: <smil name="Divide-EditList"
3: umid="060A2B340101010501010D1213000000524728714444484EEEE00E0188E130B">
4:   <body>
5:     <par>
6:       <!-- Cut 1 -->
7:       <TransferMediaId value="20070101"/>
8:       <video
9:         umid="060A2B340101010501010D121300000033516511444484EEEE00E0188E9315"
10:         clipBegin="0"clipEnd="5999"begin="0" end="5999"/>
11:       <!-- Cut 2 -->
12:       <TransferMediaId value="20070102"/>
13:       <video
14:         umid="060A2B340101010501010D121300000015294013444484EEEE00E0188E6542"
15:         clipBegin="0"clipEnd="2999"begin="6000" end="8999"/>
16:     </par>
17:   </body>
18: </smil>
```

RECORDING APPARATUS AND RECORDING METHOD, PROGRAM, AND RECORDING SYSTEM

CROSS REFERENCES TO RELATED APPLICATIONS

The present invention contains subject matter related to Japanese Patent Application JP 2007-291574 filed in the Japanese Patent Office on Nov. 9, 2007, the entire contents of which are incorporated herein by reference.

BACKGROUND OF THE INVENTION

1. Field of the Invention

The present invention relates to a recording apparatus and a recording method, a program, and a recording system, and more particularly relates to a recording apparatus and a recording method, a program, and a recording system, wherewith in a case that multiple recording apparatuses are connected via a network, shooting can be performed for a long time with a desired recording apparatus.

2. Description of the Related Art

In recent years, there are camera apparatuses such as camcorders using semiconductor memory as a recording medium to enable smaller sizes and convenience of transfer of images. Also, there is an image recording system wherein image recording apparatuses for recording images taken by multiple camera apparatuses are connected to a network, and in the event that recording capacity is insufficient at one image recording apparatus, that image recording apparatus exchanges information with other image recording apparatuses regarding whether or not there is available capacity and whether or not image recording apparatuses are available for use, with another image recording apparatus recording the shot images instead. An example of such a system is described in Japanese Patent Application Publication No. 2006-114985.

SUMMARY OF THE INVENTION

However, with an arrangement wherein the shot images are transferred to another image recording apparatus at the point that recording capacity is insufficient at the one image recording apparatus, this means that shot images are recorded the longest at the image recording apparatus at which the recording capacity has first become insufficient, and there may be cases wherein shot images are not recorded for a long time at a desired image recording apparatus.

There has been realized demand to enable shooting at a desired recording apparatus for a long time in an arrangement wherein multiple recording apparatuses are connected via a network.

A recording apparatus according to an embodiment of the present invention is connected to at least one other recording apparatus via a network, and includes: an acquisition unit configured to acquire data; a recording unit configured to record the data; a transmission unit configured to transmit, to the other recording apparatus, priority information which is information relating to priority data representing priority of recording the data to the other recording apparatus; a reception unit configured to receive other priority information which is information relating to priority data representing priority of recording data acquired at the other recording apparatus in the recording apparatus, which is transmitted from the other recording apparatus; a determination unit configured to determine priority data of the recording apparatus and the other recording apparatus, based on the priority information and the other priority information; and a transfer unit configured to transfer the data to the other recording apparatus, based on the priority data of the other recording apparatus, in the event that the recording capacity of the recording unit falls below a stipulation value corresponding to the priority data of the recording apparatus.

One of the priority information and the other priority information may be information representing a request for highest priority data, and the other may be information representing acknowledgement of changing priority data in accordance with the request.

The data may be data obtained by shooting; with the recording unit recording the data in increments of clips, which is data obtained by one shooting process; the priority information being information representing the number of clips recorded in the recording unit of which importance is low; and the other priority information being information representing the number of clips recorded in the other recording unit of which importance is low.

The priority information may be information representing the remaining capacity of the recording unit; with the other priority information being information representing the remaining capacity of the other recording unit.

The network may be a wireless network; with the priority information being the intensity of radio waves at the recording apparatus; and the other priority information being the intensity of radio waves at the other recording apparatus.

In the event that not all of the data can be recorded in the other recording apparatus, the transfer unit may divide a part of the data and transfer this to the other recording apparatus as a file, assign the file unique information which is information unique to that file, create information relating to the data following division including the unique information thereof, and record in the recording unit.

The data may be configured of image data, audio data, image proxy data wherein the data amount of the image data has been reduced, audio proxy data wherein the data amount of the audio data has been reduced, and metadata; with the transfer unit deleting the image data and the audio data from the recording unit in the event of transferring the data to the other recording apparatus.

In the event of transferring the data to the other recording apparatus, the transfer unit may describe information identifying the other recording apparatus, which is a transfer destination, in metadata recorded in the recording unit.

A recording method according to an embodiment of the present invention, for a recording apparatus having a recording unit for recording data, and connected to at least one other recording apparatus via a network, includes the steps of: acquiring data; recording the data in the recording unit; transmitting, to the other recording apparatus, priority information which is information relating to priority data representing priority of recording the data to the other recording apparatus; receiving other priority information which is information relating to priority data representing priority of recording data acquired at the other recording apparatus in the recording apparatus, which is transmitted from the other recording apparatus; determining priority data of the recording apparatus and the other recording apparatus, based on the priority information and the other priority information; and transferring the data to the other recording apparatus, based on the priority data of the other recording apparatus, in the event that the recording capacity of the recording unit falls below a stipulation value corresponding to the priority data of the recording apparatus.

A program according to an embodiment of the present invention for causing a computer to execute transfer processing for transferring data from a recording apparatus to at least one other recording apparatus connected via a network, includes the steps of: acquiring data; recording the data in a recording unit; transmitting, to the other recording apparatus, priority information which is information relating to priority data representing priority of recording the data to the other recording apparatus; receiving other priority information which is information relating to priority data representing priority of recording data acquired at the other recording apparatus in the recording apparatus, which is transmitted from the other recording apparatus; determining priority data of the recording apparatus and the other recording apparatus, based on the priority information and the other priority information; and transferring the data to the other recording apparatus, based on the priority data of the other recording apparatus, in the event that the recording capacity of the recording unit falls below a stipulation value corresponding to the priority data of the recording apparatus.

According to the above configuration, data is acquired and recorded in a recording unit; priority information which is information relating to priority data representing priority of recording the data to the other recording apparatus is transmitted to the other recording apparatus, other priority information which is information relating to priority data representing priority of recording data acquired at the other recording apparatus in the recording apparatus, which is transmitted from the other recording apparatus, is received, priority data of the recording apparatus and the other recording apparatus is determined based on the priority information and the other priority information, and the data is transferred to the other recording apparatus, based on the priority data of the other recording apparatus, in the event that the recording capacity of the recording unit falls below a stipulation value corresponding to the priority data of the recording apparatus.

A recording system according to an embodiment of the present invention includes: a first recording apparatus; and a second recording apparatus; wherein the first recording apparatus and the second recording apparatus are connected via a network; and wherein the first recording apparatus includes a first acquisition unit configured to acquire first data, a first recording unit configured to record the first data, a first transmission unit configured to transmit, to the second recording apparatus, first priority information which is information relating to priority data representing priority of recording the first data to the second recording apparatus, a first reception unit configured to receive second priority information which is information relating to priority data representing priority of recording second data acquired at the second recording apparatus in the first recording apparatus, which is transmitted from the second recording apparatus, a determination unit configured to determine priority data of the first recording apparatus and the second recording apparatus, based on the first priority information and the second priority information, and a transfer unit configured to transfer the first data to the second recording apparatus, based on the priority data of the second recording apparatus, in the event that the recording capacity of the first recording unit falls below a stipulation value corresponding to the priority data of the first recording apparatus; and wherein the second recording apparatus includes a second acquisition unit configured to acquire the second data, a second recording unit configured to record the second data, a second reception unit configured to receive the first priority information transmitted from the first transmission unit; a second transmission unit configured to transmit the second priority information to the first reception unit, and a data reception unit configured to receive the first data transferred from the transfer unit; wherein the second recording unit records the first data received by the data reception unit.

According to the above configuration, a first recording apparatus acquires first data and records the first data in a first recording unit, transmits to a second recording apparatus first priority information which is information relating to priority data representing priority of recording the first data to the second recording apparatus, receives second priority information which is information relating to priority data representing priority of recording second data acquired at the second recording apparatus in the first recording apparatus, which is transmitted from the second recording apparatus, determines priority data of the first recording apparatus and the second recording apparatus, based on the first priority information and the second priority information, and transfers the first data to the second recording apparatus, based on the priority data of the second recording apparatus, in the event that the recording capacity of the first recording unit falls below a stipulation value corresponding to the priority data of the first recording apparatus.

Also, the second recording apparatus acquires second data and records the second data in a second recording unit, receives the first priority information transmitted from the first transmission unit, transmits the second priority information to the first recording unit, and receives the first data transferred from the first recording unit, and records the first data in the second recording unit.

The recording apparatuses may be standalone devices or may be blocks performing recording processing in a recording/playback device.

Accordingly, with the above configurations, data can be transferred to other camera apparatuses, and in the event that multiple camera apparatuses are connected via a network, shooting with a desired camera apparatus can be performed for a long time.

BRIEF DESCRIPTION OF THE DRAWINGS

FIG. 8 is another diagram illustrating an example of a screen for transmitting highest-priority request information;

FIG. 9 is yet another diagram illustrating an example of a screen for transmitting highest-priority request information;

FIG. 10 is yet another diagram illustrating an example of a screen for transmitting highest-priority request information;

FIG. 12 is a diagram for explaining user operations for transmitting acknowledgement information;

FIG. 13 is a diagram for explaining user operations for transmitting acknowledgement information;

FIG. 15 is a flowchart for explaining camera apparatus information list obtaining processing performed by an acquisition unit shown in FIG. 4;

FIG. 16 is a diagram illustrating an example of a priority list;

FIG. 18 is a diagram illustrating an example of non-real-time metadata of a clip regarding which all has been transferred to a single camera apparatus;

FIG. 19 is a diagram illustrating an example of non-real-time metadata of a clip which has been divided and transferred to multiple camera apparatuses;

FIG. 20 is a diagram illustrating an example of a division information list;

DESCRIPTION OF THE PREFERRED EMBODIMENTS

Figure 1:
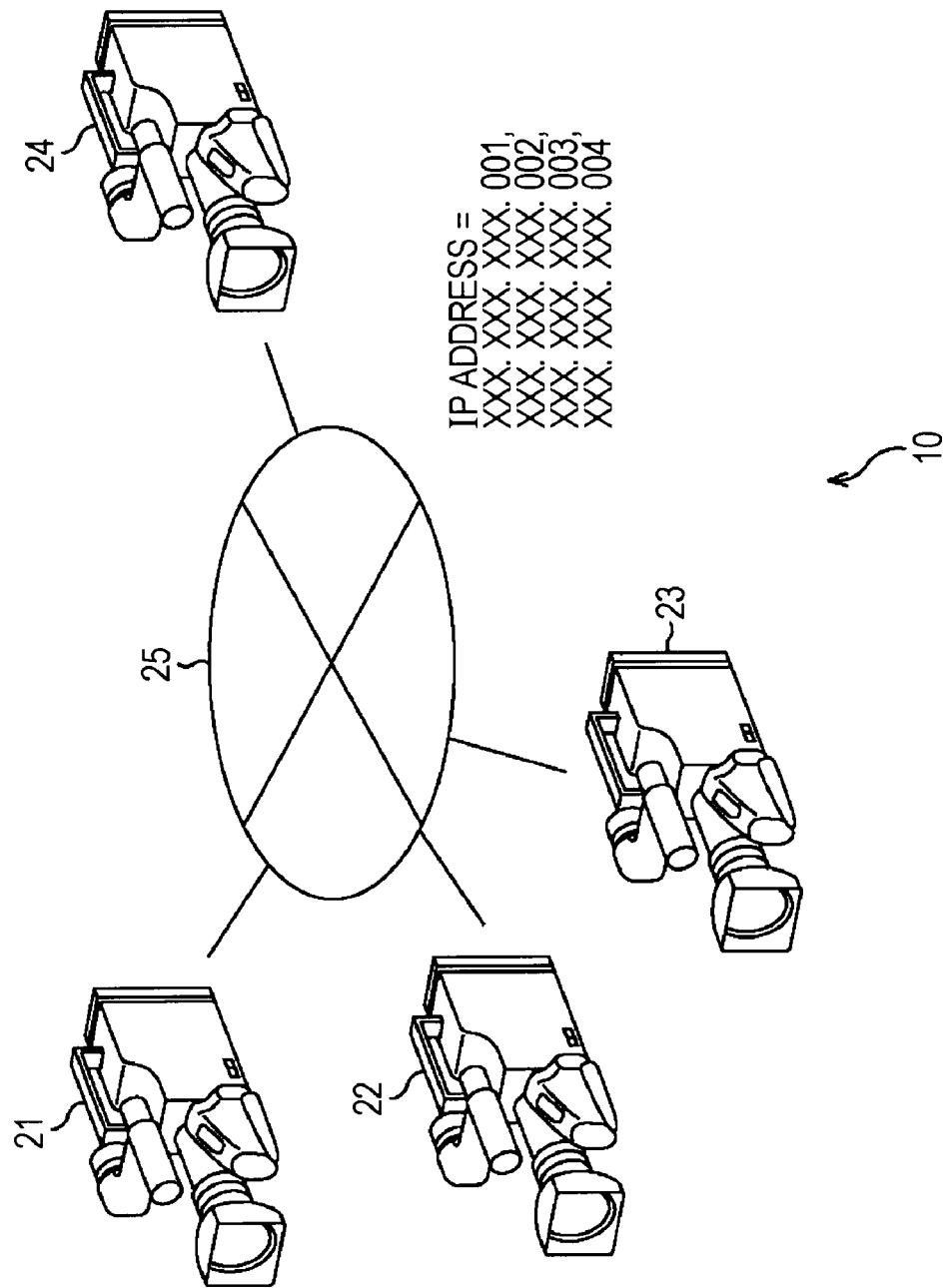
FIG. 1 is a diagram illustrating a configuration example of an embodiment of a recording system to which the present invention has been applied.

The following is a detailed description of a specific embodiment to which the present invention has been applied. FIG. 1 illustrates a configuration example of an embodiment of a recording system to which the present invention has been applied. In FIG. 1, a recording system 10 is configured by four camera apparatuses being connected via a wireless network 25.

The camera apparatuses 21 through 24 are each configured of a camcorder, for example. Note that in the following description, if there is no particular call to distinguish between the camera apparatuses 21 through 24, these will be collectively referred to as "camera apparatus 20".

A camera apparatus 20 obtains and stores authentication information beforehand, such as an IP (Internet Protocol) address or the like of a camera apparatus 20 which may be connected to the wireless network 25. This authentication information obtaining method will be described later with reference to FIG. 24.

In the example in FIG. 1, the camera apparatus 20 stores the IP address "XXX.XXX.XXX.001" of the camera apparatus 21, the IP address "XXX.XXX.XXX.002" of the camera apparatus 22, the IP address "XXX.XXX.XXX.003" of the camera apparatus 23, and the IP address "XXX.XXX.XXX.004" of the camera apparatus 24.

Also, the camera apparatus 20 shoots a subject (including acquisition of audio), and records shot data made up of image data and audio data obtained as a result thereof, and so forth. Further, at the time of starting shooting, the camera apparatus 20 connects to the wireless network 25, and searches for a camera apparatus 20 connected to itself via the wireless network 25 using the IP address of another camera apparatus 20 that is stored.

Subsequently, the camera apparatus 20 continues to search for a camera apparatus 20 connected to itself via the wireless network 25 at predetermined intervals, and accordingly can tell as other camera apparatuses 20 join and leave the wireless network 25. Accordingly, even if a new camera apparatus is connected to the wireless network 25 during shooting, the camera apparatus 20 can tell that the new camera apparatus has joined.

Also, at least one of the camera apparatuses 21 through 24 transmits, to the other camera apparatuses 20 via the wireless network 25, highest priority request information representing a request for priority data of the highest priority, serving as priority information which is information relating to priority data representing the priority of recording shot data to other camera apparatuses 20.

Further, the camera apparatus 20 determines the highest priority data to transfer to the camera apparatuses 20, based on the highest priority request information. In the event that the remaining capacity of the recording unit (FIG. 3, described later) to record the shot data becomes lower than a stipulated value of remaining capacity corresponding to its own priority data (hereafter referred to as "remaining capacity stipulation value"), the camera apparatus 20 transmits shot data to another camera apparatus 20 which has remaining capacity in the recording unit that is greater than the remaining capacity stipulation value corresponding to its own priority data, based on the priority data of the other camera apparatus 20.

Figure 2:
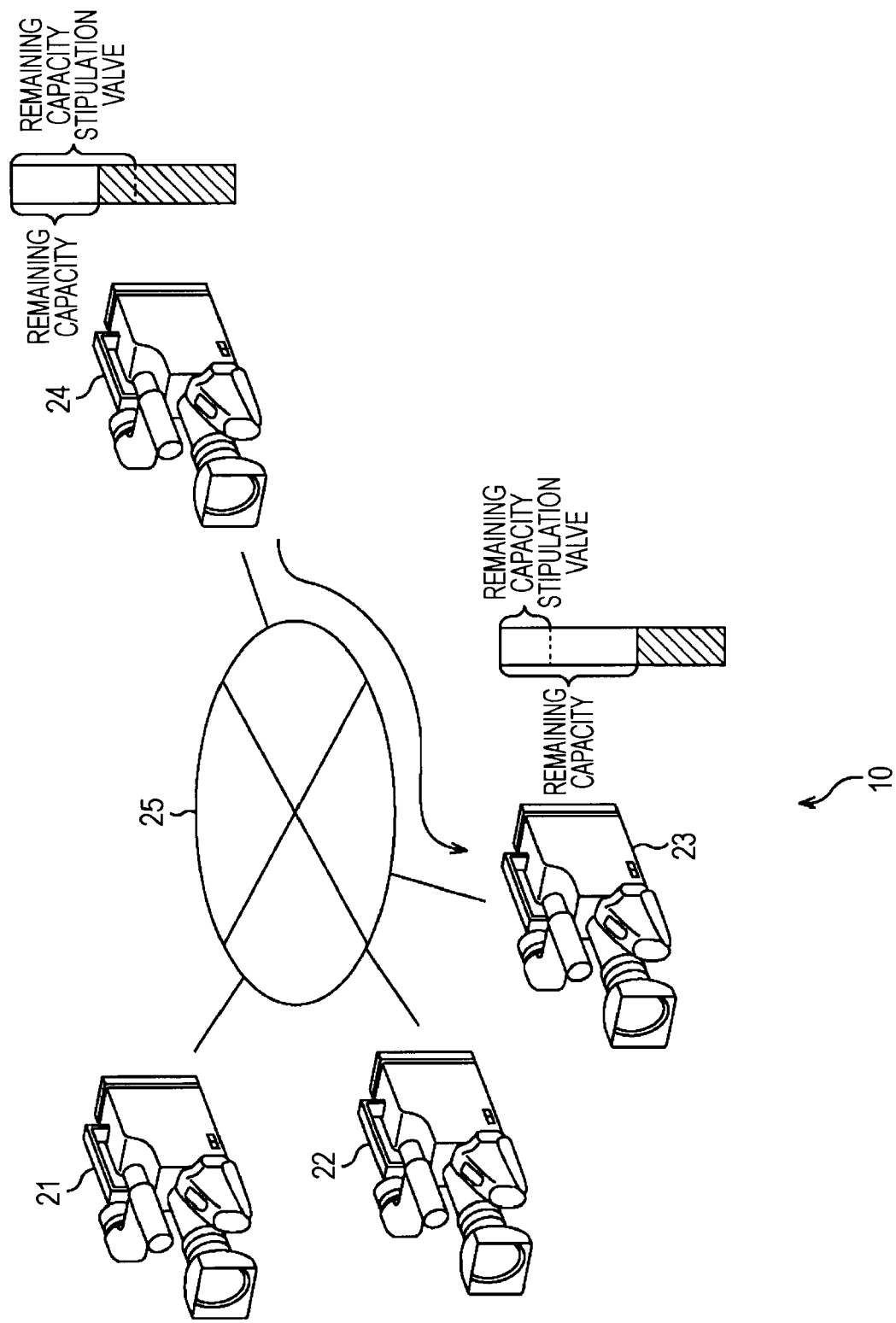
FIG. 2 is a diagram for explaining an overview of processing with the recording system shown in FIG. 1.

In the example in FIG. 2, the remaining capacity of the recording unit of the camera apparatus 24 is lower than the remaining capacity stipulation value, so the camera apparatus 24 transmits the shot data to the camera apparatus 23 which still has remaining capacity of the recording unit greater than the remaining capacity stipulation value.

Figure 3:
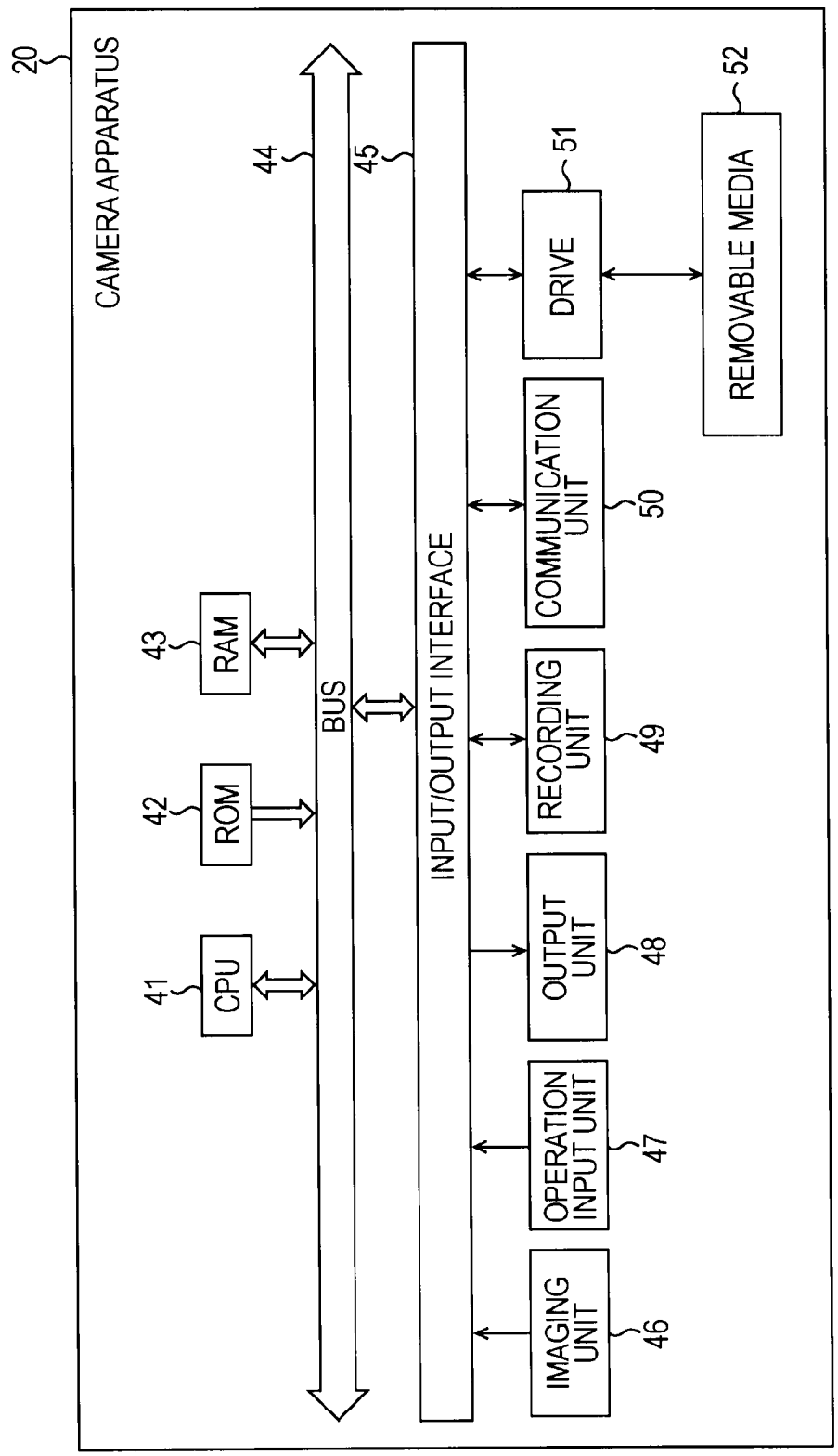
FIG. 3 is a block diagram illustrating a hardware configuration example of a camera apparatus.

FIG. 3 illustrates a hardware configuration of the camera apparatus 20. In FIG. 3, a CPU (Central Processing Unit) 41 executes various types of processing following programs recorded in ROM (Read Only Memory) or a recording unit 49. RAM (Random Access Memory) 43 stores programs to be executed by the CPU 41, authentication information of camera apparatuses 20 which may be connected to the wireless networks shown in FIG. 1, and so forth, as appropriate. The CPU 41, ROM 42, and RAM 43 are connected with each other via a bus 44.

The CPU 41 is also connected to an input/output interface 45 via the bus 44. The input/output interface 45 has connected thereto a shooting unit 46 for shooting a subject, an operation input unit 47 configured of operating buttons, a microphone, and so forth, and an output unit 48 configured of a display, speaker, and so forth.

The CPU 41 uses authentication information of camera apparatuses 20 stored in the RAM 43 for example, to search for other camera apparatuses 20 connected via the wireless network 25 at predetermined intervals during shooting. Also, the CPU 41 controls the shooting unit 46 to shoot image data in accordance with input from the operation input unit 47 for example, and records the shot data obtained thereby in the recording unit 49 in increments of clips. Note that a "clip" refers to a collection of shot data obtained by one shooting processing (shooting processing from starting of shooting to ending of shooting), metadata, and so forth.

Also, the CPU 41 transmits highest priority request information serving as priority information to all other camera apparatuses 20 connected to the wireless network 25 from a later-described communication unit 50 via the wireless network 25, in accordance with input from the operation input unit 47.

Further, based on the highest priority information, the CPU 41 determines the priority data of each camera apparatus 20. Also, the CPU 41 obtains a list of camera apparatus information made up of remaining capacity information indicating the remaining capacity of the recording unit 49 of each camera apparatus 20, and radio wave information indicating the intensity of radio waves detected by the communication unit 50 (hereafter referred to as "camera apparatus information list"). The CPU 41 transmits the shot data recorded in the recording unit 49 to another camera apparatus 20 via the communication unit, based on priority data of the other camera apparatus.

Note that one of the camera apparatuses 21 through 24 connected via the wireless network 25 generates and manages the camera apparatus information list. Accordingly, the CPU 41 of the one camera apparatus 20 managing the camera apparatus information list obtains camera apparatus information from the other camera apparatuses 20 via the communication unit 50, and generates the camera apparatus information list, thereby obtaining the camera apparatus information list. On the other hand, the other camera apparatuses 20 which do not manage the camera apparatus information list receive the camera apparatus information list transmitted from the one camera apparatus 20 which manages the camera apparatus information list via the communication unit 50, thereby obtaining the camera apparatus information list.

The input/output interface 45 is connected with the recording unit 49 configured of a hard disk or the like for recording shot data shot by the shooting unit 46, and the communication unit 50 for communicating with external devices such as other camera apparatuses 20 via the wireless network 25.

Further, a drive 51 to which the input/output interface 45 is connected drives removable media 52 such as magnetic disks, optical discs, magneto-optical disks, semiconductor memory, or the like, mounted thereto, and obtains programs and data and the like recorded thereon. The programs and data obtained are transferred to the recording unit 49 and recorded as appropriate. Note that programs may be obtained via the communication unit 50 and recorded in the recording unit 49.

Figure 4:
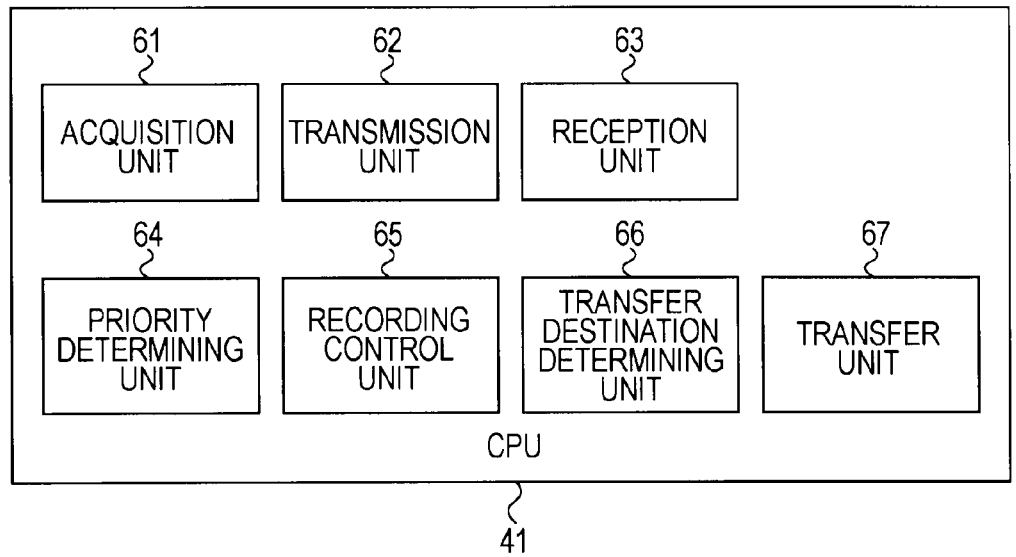
FIG. 4 is a block diagram illustrating a functional configuration example of a CPU shown in FIG. 3.

FIG. 4 shows a functional configuration example of the CPU 41 shown in FIG. 41. The CPU 41 shown in FIG. 4 is configured of an acquisition unit 61, a transmission unit 62, a reception unit 63, a priority determining unit 64, a recording control unit 65, a transfer destination determining unit 66, and a transfer unit 67.

The acquisition unit 61 obtains the camera apparatus information list and supplies this to the priority determining unit 64. The acquisition unit 61 also searches for the other camera apparatuses 20 connected via the wireless network 25 at predetermined intervals during shooting. The acquisition unit 61 moreover supplies the priority determining unit 64 with camera apparatus identification information (e.g., IP address, unique ID assigned to each camera apparatus 20, and so forth), which is information for identifying the searched camera apparatus 20.

The transmission unit 62 transmits highest priority request information supplied from the priority determining unit 64, to all of the other camera apparatuses 20 connected via the wireless network 25. Also, the transmission unit 62 transmits acknowledgement information representing acknowledgement of changing of priority data in accordance with a request which the highest priority request information received by the reception unit 63 indicates, supplied from the priority determining unit 64, to the camera apparatus 20 which has transmitted the highest priority request information serving as priority information.

The reception unit 63 receives the highest priority request information transmitted from the other camera apparatuses 20 connected via the wireless network 25 by way of the communication unit 50, and supplies this to the priority determining unit 64. Also, the reception unit 63 receives acknowledgement information of highest priority request information transmitted from the transmission unit 62 that is transmitted from the other camera apparatuses 20 connected via the wireless network 25, and supplies this to the priority determining unit 64.

The priority determining unit 64 generates highest priority request information in accordance with input from the operation input unit 47 shown in FIG. 3, and supplies this to the transmission unit 62. Also, the priority determining unit 64 generates acknowledgement information of highest priority request information supplied from the reception unit 63 in accordance with input from the operation input unit 47, and supplies this to the transmission unit 62. Further, the priority determining unit 64 determines the priority data of each camera apparatus 20 connected via the wireless network 25, based on the generated highest priority information and acknowledgement information supplied from the reception unit 63, or generated acknowledgement information and highest priority information supplied from the reception unit 63, and camera apparatus identification information supplied from the acquisition unit 61. The priority determining unit 64 stores the camera apparatus identification information of each camera apparatus 20, and priority list correlating priority data and the camera apparatus information, in the RAM 43.

The recording control unit 65 controls the shooting unit 46 shown in FIG. 3 in accordance with input from the operation input unit 47, and shoots. Also, the recording control unit 65 supplies shot data obtained as a result of shooting to the recording unit 49 so as to be recorded. Moreover, the recording control unit 65 sets a remaining capacity stipulation value from the priority list stored in the RAM 43, based on its own priority data.

Note that the remaining capacity stipulation value here is represented in the form of percentage as to the recording capacity of the entire region of the recording unit 49 shown in FIG. 3 that is capable of recording shot data. Also, the remaining capacity stipulation value is set such that a remaining capacity stipulation value corresponding to priority data of a priority which is not the highest priority is smaller than a remaining capacity stipulation value corresponding to priority data of a priority which is the highest priority.

Now, 100% may be set as the remaining capacity stipulation value corresponding to priority data of highest priority. In this case, the camera apparatus 20 to which the priority data of highest priority has been set can have the greatest possible remaining capacity at all times. This "greatest possible remaining capacity" basically is the recording capacity of the entire region of the recording unit 49 that is capable of recording shot data, but in cases where the shooting rate is higher than the transfer rate, the shot data generated by the difference therebetween is temporarily recorded in the recording unit 49, and accordingly in this case would not be the entire region of the recording unit 49 that is capable of recording shot data.

Also, in the event that a greater percentage than 0% is to be set as the remaining capacity stipulation value, a case wherein shot data is not be recorded due to the transfer rate being lower than the shooting rate can be prevented.

The recording control unit 65 also detects the remaining capacity of the recording unit 49, and in the event that the remaining capacity is lower than the remaining capacity stipulation value, instructs the transfer destination determining unit 66 to determine the transfer destination.

The transfer destination determining unit 66 decides the transfer destination camera apparatus 20 and shot data to transfer, from the priority list stored in the RAM 43, in accordance with the instruction to determining the transfer destination that is supplied from the recording control unit 65, and supplies the transfer unit 67 with the camera apparatus identification information of the transfer destination camera apparatus 20, and transfer object identification information (e.g., a later-described UMID (Unique Material Identifier) or the like) which is information for identifying the object of transfer.

The transfer unit 67 reads out the shot data which is to be transferred, from the recording unit 49 shown in FIG. 3, based on the transfer object identification information supplied from the transfer destination determining unit 66. Also, the transfer unit 67 transmits the shot data which has been read out to the transfer destination camera apparatus 20 via the communication unit 50 and the wireless network 25, based on the camera apparatus identification information supplied from the transfer destination determining unit 66.

Figure 5:
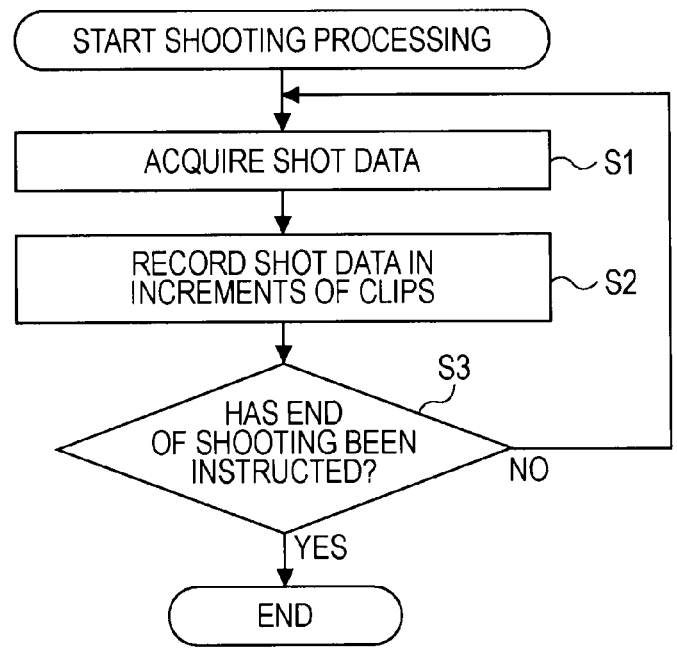
FIG. 5 is a flowchart for explaining shooting processing with the camera apparatus.

Next, shooting processing at the camera apparatus 20 will be described with reference to FIG. 5. This shooting processing is started at the time of starting of shooting having been instructed by the user operating the operation input unit 47, for example.

In step S1, the shooting unit 46 performs shooting under control of the recording control unit 65, and acquires shot data.

In step S2, the control unit 65 records the shot data acquired in step S1 in the recording unit 49, in increments of clips.

In step S3, the recording control unit 65 determines whether or not the user has instructed ending of the shooting in accordance with input from the operation input unit 47, and in the event that determination is made that ending of shooting has not been instructed, the flow returns to step S1, and the above-described processing is repeated.

On the other hand, in the event that determination is made that ending of shooting has been instructed, the processing ends.

Next, user operations for transmitting highest priority request information will be described with reference to FIGS. 6 through 10. First, an example of operating buttons for the operation input unit 47 used for operations for transmitting the highest priority request information will be described with reference to FIG. 6.

Figure 6:
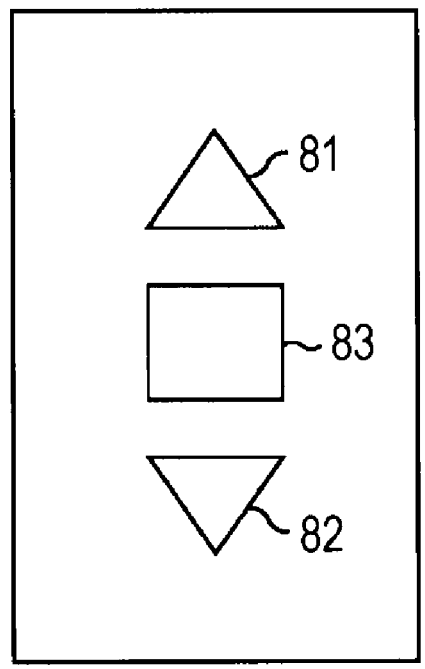
FIG. 6 is a diagram for explaining an example of operating buttons of an operation input unit.

An operation button 81 shown in FIG. 6 is operated to move a cursor displayed on the output unit 48 shown in FIG. 3 upwards. Also, an operation button 82 is operated to move a cursor displayed on the output unit 48 downwards. Further, an operation button 83 is operated to instruct finalizing of input corresponding to the position of the cursor displayed on the output unit 48.

Next, a screen for transmitting the highest priority request information will be described with reference to FIGS. 7 through 10. Note that in the example in FIGS. 7 through 10, the highest priority request information at the camera apparatus 24 will be transmitted.

Figure 7:
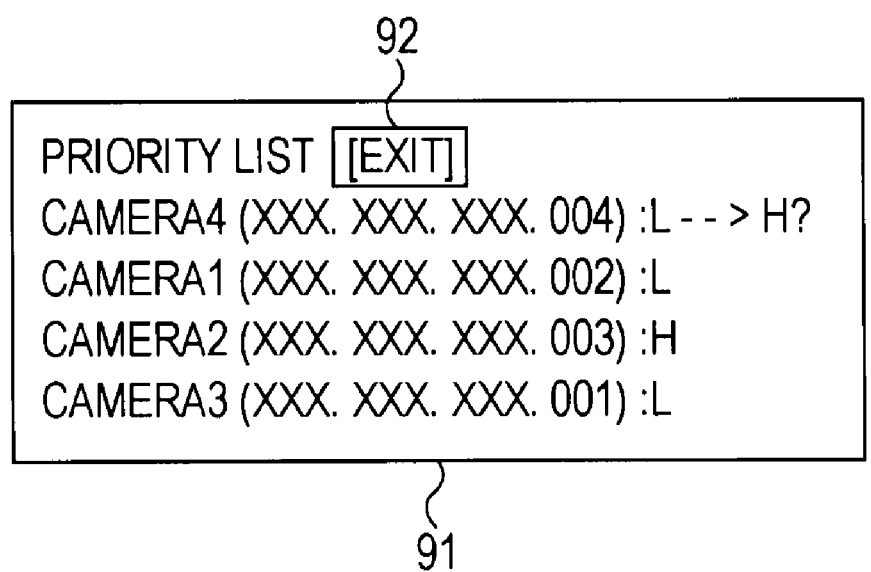
FIG. 7 is a diagram illustrating an example of a screen for transmitting highest-priority request information.

First, the user operates the operation input unit 47 to display a priority screen 91 showing the priority data of each camera apparatus 20 on the output unit 48 shown in FIG. 3, as shown in FIG. 7. In the priority screen 91 in FIG. 7, "PRIORITY LIST", indicating that this is a priority screen, and "EXIT" for ending display of the priority screen, are displayed. Note that in the state shown in FIG. 7, a cursor 92 is situated at "EXIT", so operating the operating button 83 (FIG. 6) in this state would end display of the priority screen.

Also, displayed in the second row are "CAMERA4" indicating the ID "4" assigned to the camera apparatus 24 which is the camera apparatus itself, "XXX.XXX.XXX.004" which is the IP address of the camera apparatus 24, "L" which is the current priority data, and "H" which is the priority data following changing. Note that in priority data, "H" represents highest priority, and "L" indicates priority which is not highest priority.

Also, displayed in the third row are "CAMERA1" indicating the ID "1" assigned to the other camera apparatus 21, "XXX.XXX.XXX.001" which is the IP address of the camera apparatus 21, and "L" which is the current priority data. In the same way, displayed in the fourth row are "CAMERA2" indicating the ID "2" assigned to the other camera apparatus 22, "XXX.XXX.XXX.002" which is the IP address of the camera apparatus 22, and "H" which is the current priority data, and displayed in the fifth row are "CAMERA3" indicating the ID "3" assigned to the other camera apparatus 23, "XXX.XXX.XXX.003" which is the IP address of the camera apparatus 23, and "L" which is the current priority data.

In the event that the user operates the operating button 82 (FIG. 6) in the priority screen 91 to move the cursor 92 downwards, places the cursor 92 at the display position of the priority data "H" following changing at the second row as shown in FIG. 8, and operates the operating button 83, the camera apparatus 24 transmits the highest priority request information to all other camera apparatuses 21 through 23.

Upon receiving acknowledgement information from the camera apparatuses 21 through 23, the priority screen 91 in FIG. 8 is changed to the priority screen 91 in FIG. 9. That is to say, an "OK" indicating that changing of priority data has been acknowledged is displayed next to the display position of the priority data "H" following changing at the second row in the priority screen 91 in FIG. 8, and also the cursor 92 is displayed at the display position of the priority data "H" and "OK" following changing. Note that an arrangement may be made wherein the cursor 92 is not displayed at the display position of the priority data "H" and "OK" following changing of the camera apparatus 24, but rather the "OK" blinks.

Now, upon the user operating the operating button 83, the priority data of the camera apparatus 24 is changed from "L" to "H", and the priority screen 91 in FIG. 9 is changed to the priority screen 91 shown in FIG. 10. That is to say, the priority data of the camera apparatus 24 shown in the second row is changed from "L" to "H", and the priority data following changing is changed from "H" to "L". Also, the priority data of the camera apparatus 22 displayed in the fourth row is changed from "H" to "L".

Figure 11:
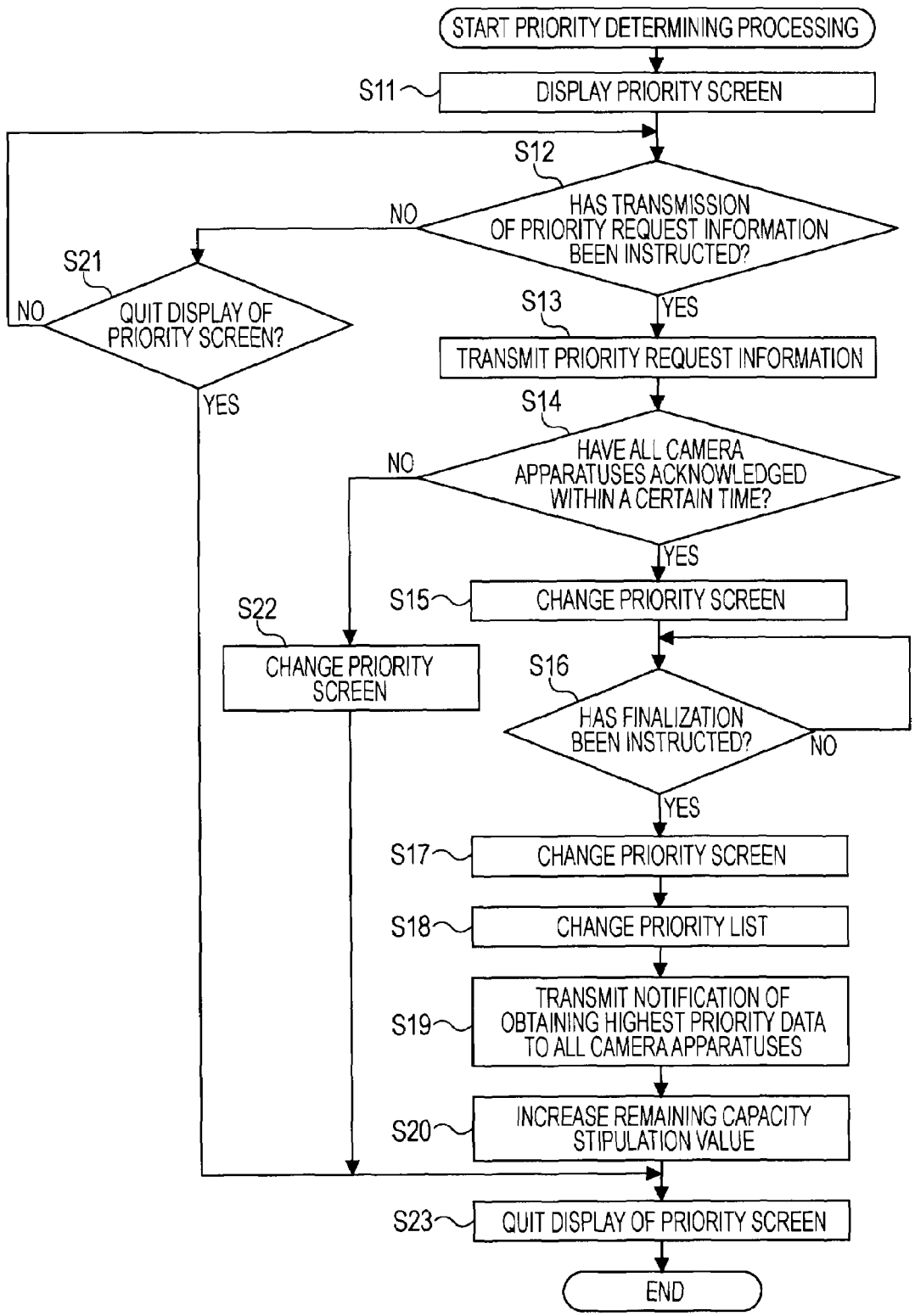
FIG. 11 is a flowchart for explaining priority determining processing performed by the CPU shown in FIG. 4.

Next, priority determining processing performed by the CPU shown in FIG. 4 will be described with reference to FIG. 11. This priority determining processing is started at the time of the user operating the operation input unit 47 to instruct displaying of the priority screen 91, for example.

In step S11, the priority determining unit 64 displays the priority screen 91 shown in FIG. 7, based on the priority list stored in the RAM 43.

In step S12, the priority determining unit 64 determines whether or not transmission of highest priority request information has been instructed by the user, based on input from the operation input unit 47, i.e., whether or not the cursor 92 has been placed at the display position of the priority data following change in the priority screen 91 and the operating button 83 operated. In the event that determination is made in step S12 that transmission of highest priority request information has been instructed, the priority determining unit 64 generates highest priority request information and supplies this to the transmission unit 62.

In step S13, the transmission unit 62 transmits the highest priority request information from the priority determining unit 64 to all other camera apparatuses 20 connected to the wireless network 25 via the communication unit 50.

In step S14, the reception unit 63 determines whether or not all camera apparatuses 20 to which the highest priority request information has been transmitted in step S13 have acknowledged the change in priority data in response to the request which the highest priority request information represents within a predetermined amount of time, i.e., whether or not acknowledgement information has been received from all camera apparatuses 20 to which the highest priority request information has been transmitted within a predetermined amount of time from the transmission of the highest priority request information.

In the event that determination is made in step S14 that all camera apparatuses 20 to which the highest priority request information has been transmitted have acknowledged changing of priority data in response to the request which the highest priority request information represents, within a predetermined amount of time, the reception unit 63 supplies the received acknowledgement information to the priority determining unit 64.

In step S15, the priority determining unit 64 changes the priority screen 91 shown in FIG. 8 on the output unit 48 to the priority screen 91 shown in FIG. 9.

In step S16, the priority determining unit 64 determines whether or not determination has been instructed by the user, i.e., whether or not the operating button 83 has been operated in a state wherein the cursor 92 is placed at the display position of the priority data "H" and "OK" following change in the priority screen 91 in FIG. 9. In the event that determination is made in step S16 that the user has not instructed determination, the priority determining unit 64 stands by until the user does instruct determination.

On the other hand, in the event that determination is made in step S16 that the user has not instructed determination, in step S17 the priority determining unit 64 changes the priority screen 91 in FIG. 9 to the priority screen 91 in FIG. 10.

In step S18, the priority determining unit 64 determines the priority data of each camera apparatus 20 so that its own priority data represents the highest priority, based on the generated highest priority request information and the acknowledgement information supplied from the reception unit 63, and changes the priority list. For example, in the event that the user has operated the operating button 83 in the priority screen 91 in FIG. 9, the priority determining unit 64 changes the priority data of itself within the priority list from priority data of a priority which is not the highest priority, to priority data of highest priority. The priority determining unit 64 generates a notification of obtaining the priority data of highest priority, and supplies this to the transmission unit 62.

In step S19, the transmission unit 62 transmits the notification of obtaining the priority data of highest priority that has been supplied from the priority determining unit 64 to all of the camera apparatuses 20 to which the highest priority request information has been transmitted, via the communication unit 50.

In step S20, the recording control unit 65 increases the remaining capacity stipulation value from the remaining capacity stipulation value corresponding to the priority data which is of a priority that is not the highest priority, to the remaining capacity stipulation value corresponding to the priority data which is of the highest priority, based on its own priority data within the priority list following changing, that is stored in the RAM 43, and the flow proceeds to step S23.

On the other hand, in the event that determination is not made in step S12 that transmission of highest priority request information has been instructed, in step S21 the priority determining unit 64 determines whether or not to end the display of the priority screen 91, i.e., whether or not the operating button 83 has been operated in a state wherein the cursor 92 is placed over the "EXIT" displayed at the highest row in the priority screen 91 in FIG. 7.

In the event that determination is not made in step S21 to end display of the priority screen 91, the flow returns to step S12, and the above-described processing is repeated. On the other hand, in the event that determination is made in step S21 to end display of the priority screen 91, the flow proceeds to step S23.

On the other hand, in the event that determination is not made in step S14 that all camera apparatuses 20 to which the highest priority request information has been transmitted in step S13 have acknowledged changing of priority data in response to the request which the highest priority request information represents, within a predetermined amount of time, in step S22 the priority determining unit 64 changes the priority screen 91 in FIG. 8 to a priority screen 91 in FIG. 9 where "NG", meaning "no good", is displayed instead of the "OK", and the flow proceeds to step S23.

In step S23, the priority determining unit 64 ends the display of the priority screen 91, and the processing ends.

Next, description will be made of user operations for transmitting acknowledgement information, with reference to FIGS. 12 and 13. Note that in FIGS. 12 and 13, we will say that the camera apparatus 22 transmits acknowledgement information as to the highest priority request information transmitted by the camera apparatus 24. Also, we will say that the operating buttons used for operations for transmitting the acknowledgement information are the same as the operating buttons 81 through 83 used for operations for transmitting the highest priority request information shown in FIG. 6.

Upon highest priority request information being received, the priority screen 101 shown in FIG. 12 is displayed. The priority screen 101 in FIG. 12 has "PRIORITY LIST" and "EXIT" displayed at the top row, as with the priority screen 91 shown in FIGS. 7 through 10.

Also, displayed in the second row are "CAMERA2" indicating the ID "2" assigned to the camera apparatus 22 which is the camera apparatus itself, "XXX.XXX.XXX.002" which is the IP address of the camera apparatus 22, "H" which is the current priority data, and "L" which is the priority data following changing. Also, the third and fourth rows show other camera apparatuses 21 and 22 in the same way as with the priority screen 91 shown in FIGS. 7 through 10.

Also, displayed in the fifth row are "CAMERA4" indicating the ID "4" assigned to the camera apparatus 24, which has transmitted the highest priority request information, "XXX.XXX.XXX.004" which is the IP address of the camera apparatus 24, "L" which is the current priority data, "H" which is the priority data to be changed to at the time of receiving acknowledgement information from all camera apparatuses 20 to which the highest priority request information has been transmitted, and "OK" indicating acknowledgement. Also, displayed in the sixth row are "L" which is the current priority data of the camera apparatus 24, "H" which is the priority data to be changed to at the time of receiving acknowledgement information from all camera apparatuses 20 to which the highest priority request information has been transmitted, and "NG" indicating negation.

At the time of transmitting acknowledgement information to the camera apparatus 24, the user operates the operating button 81 or 82 to position the cursor 102 at the display position of "H" which is the priority data following changing, and "OK" representing acknowledgement, in the fifth row. At this time, the display of the current priority data "H" of the camera apparatus 22 and the priority data "L" following changing in the second row blinks.

In the event that the user operates the operating button 83 in this state, the camera apparatus 22 transmits acknowledgement information to the camera apparatus 24. At this time, the camera apparatus 22 changes the priority screen 101 in FIG. 12 to the priority screen 101 shown in FIG. 13. Note that the acknowledgement information transmitted here is used for determination in step S14 in FIG. 11.

That is to say, the cursor 102 is positioned at the display position of the "EXIT" at the highest row. Also, the current priority data "H" of the camera apparatus 22 in the second row is changed to "L", the priority data "L" following changing is changed to "H", and both blink. Also, the current priority data "L" of the camera apparatus 22 in the fifth row is changed to "H", and blinks. Further, the priority data "H" following changing and "OK" indicating acknowledgement in the fifth row, and the display of the sixth row, are deleted.

Subsequently, in step S19 in FIG. 11, upon a notification of obtaining priority data of highest priority being transmitted from the camera apparatus 24, blinking of the priority screen 101 in FIG. 13 is stopped at the camera apparatus 22.

Figure 14:
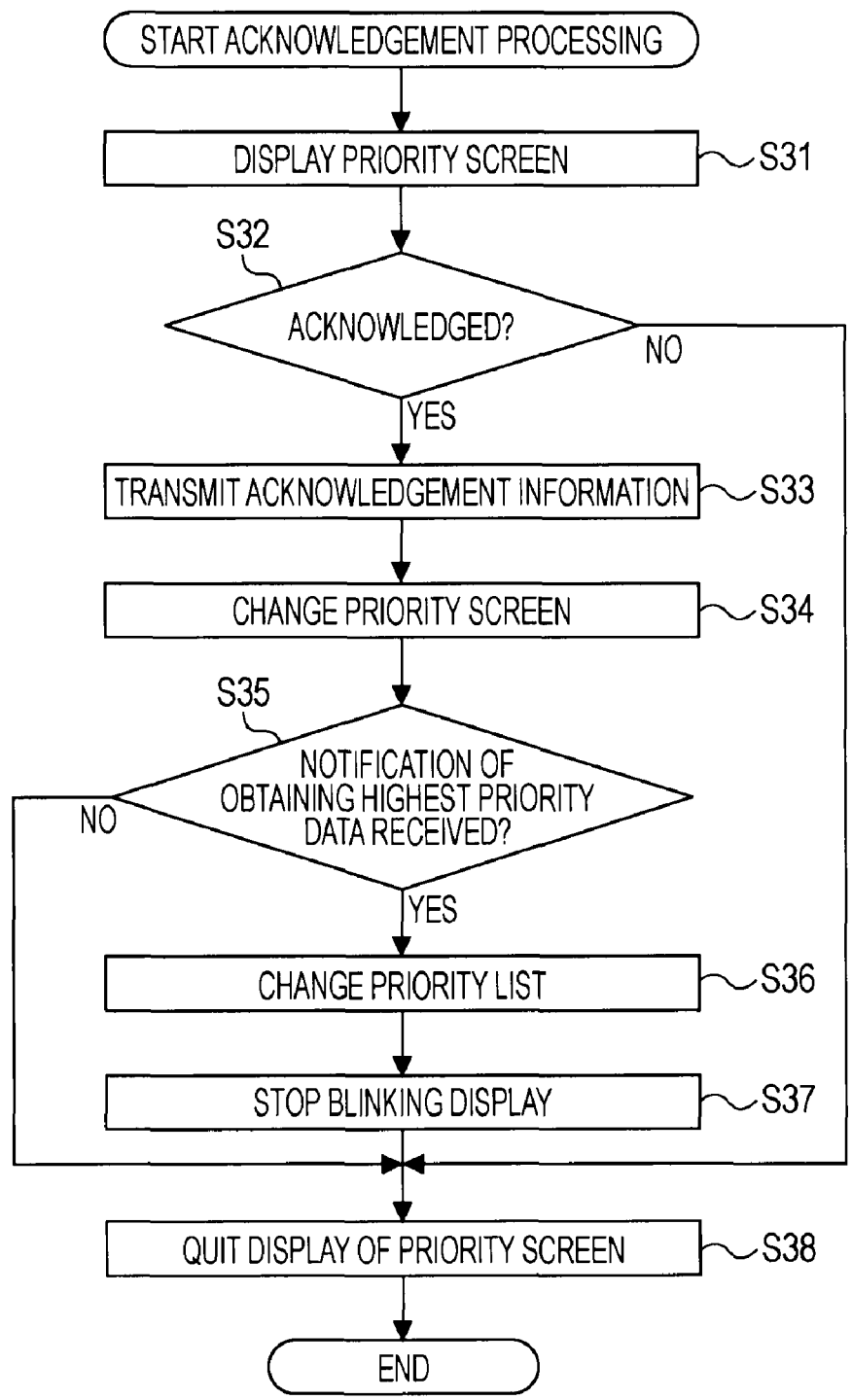
FIG. 14 is a flowchart for explaining acknowledgement processing performed by the CPU shown in FIG. 4.

Next, the acknowledgement processing performed by the CPU 41 will be described with reference to FIG. 14. This acknowledgement processing is started at the time of receiving highest priority request information from another camera apparatus 20, for example.

In step S31, the priority determining unit 64 displays the priority screen 101 shown in FIG. 12 on the output unit 48 in FIG. 3. In step S32, the priority determining unit 64 determines, with regard to another camera apparatus 20 which has transmitted highest priority request information to this camera apparatus, whether or not the user has acknowledged changing of priority data in accordance with the request indicated by the highest priority request information, i.e., whether the operating button 83 has been operated in a state wherein the cursor 102 is placed at the display position of priority data "H" and "OK" indicating acknowledgement on the priority screen 101 in FIG. 12, in accordance with input from the operation input unit 47 in FIG. 3.

In the event that determination is made in step S32 that the user has acknowledged changing of priority data in accordance with the request indicated by the highest priority request information, for the camera apparatus 20 which has transmitted the highest priority request information, the priority determining unit 64 generates acknowledgement information of the received highest priority request information and supplies this to the transmission unit 62.

In step S33, the transmission unit 62 transmits the acknowledgement information from the priority determining unit 64 to the other camera apparatus 20 which has transmitted the highest priority request information.

In step S34, the priority determining unit 64 changes the priority screen 101 shown in FIG. 12 to the priority screen 101 shown in FIG. 13.

In step S35, the reception unit 63 determines whether or not a notification of obtaining priority data of highest priority has been received from the camera apparatus 20 which has transmitted the acknowledgement information in step S33.

In the event that determination is made that a notification of obtaining priority data of highest priority has been received in step S35, in step S36 the priority determining unit 64 determines the priority data of each camera apparatus 20 such that the priority data of the camera apparatus 20 which has transmitted the highest priority request information represents the highest priority, based on the generated acknowledgement information, and on the highest priority request information supplied from the reception unit 63, and changes the priority list.

In step S37, the reception unit 63 stops blinking of the priority screen 101 in FIG. 13, and the flow proceeds to step S38.

On the other hand, in the event that determination is not made in step S35 that a notification of obtaining priority data of highest priority has been received, i.e., in the event that at least one camera apparatus 20 which has received the highest priority request information has not transmitted acknowledgement information within the predetermined amount of time, the processing in steps S36 and S37 is skipped, and the flow proceeds to step S38. That is to say, in this event, the priority list and priority screen 101 are not changed.

Also, in the event that determination is not made in step S32 that the user has acknowledged changing of priority data in accordance with the request indicated by the highest priority request information, for the camera apparatus 20 which has transmitted the highest priority request information, the processing in steps S33 through S37 is skipped, and the flow proceeds to step S38. That is to say, in this case, the acknowledgement information is not transmitted, nor are the priority list and priority screen 101 changed.

In step S38, the reception unit 63 ends display of the priority screen 101, and the processing ends.

Next, obtaining processing of a camera apparatus information list by the acquisition unit 61 shown in FIG. 4 will be described with reference to FIG. 15. This obtaining processing is started at each certain time (e.g., every 10 minutes, when the bottom digit of the minute at the current point-in-time is "9"), for example. We will say that in FIG. 15, the camera apparatus 24 is the camera apparatus which manages the camera apparatus information.

In step S80, the acquisition unit 61 of the camera apparatus 24 requests camera apparatus information from the camera apparatus 21 via the communication unit 50.

In step S50, the acquisition unit 61 of the camera apparatus 21 receives the request for the camera apparatus information from the camera apparatus 24 via the communication unit 50.

In step S51, the acquisition unit 61 of the camera apparatus 21 transmits the camera apparatus information to the camera apparatus 24 via the communication unit 50.

In step S81, the acquisition unit 61 of the camera apparatus 24 receives the camera apparatus information transmitted from the camera apparatus 21 via the communication unit 50.

In step S82, the acquisition unit 61 of the camera apparatus 24 requests the camera apparatus 22 for camera apparatus information via the communication unit 50.

In step S60, the acquisition unit 61 of the camera apparatus 22 receives the camera apparatus information request from the camera apparatus 24 in the same way as with the acquisition unit 61 of the camera apparatus 21, and in step S61 transmits the camera apparatus information to the camera apparatus 24.

In step S83, the acquisition unit 61 of the camera apparatus 24 receives the camera apparatus information transmitted from the camera apparatus 22 via the communications unit 50.

In step S84, the acquisition unit 61 of the camera apparatus 24 requests the camera apparatus 23 for camera apparatus information via the communication unit 50.

In step S70, the acquisition unit 61 of the camera apparatus 23 receives the camera apparatus information request from the camera apparatus 24 in the same way as with the acquisition unit 61 of the camera apparatus 21, and in step S71 transmits the camera apparatus information to the camera apparatus 24.

In step S85, the acquisition unit 61 of the camera apparatus 24 receives the camera apparatus information transmitted from the camera apparatus 23 via the communication unit 50.

In step S86 the acquisition unit 61 of the camera apparatus 24 creates a camera apparatus information list based on the camera apparatus information received in steps S81, S83, and S85, and the camera apparatus information of itself, and supplies this to the priority determining unit 64. The priority determining unit 64 of the camera apparatus 24 updates the priority list based on this camera apparatus information list.

In step S87, the acquisition unit 61 of the camera apparatus 24 transmits the camera apparatus information list created in step S86 to the camera apparatus 21 at a predetermined timing (e.g., when the bottom digit of the minute at the current point-in-time is "0").

In step S52, the acquisition unit 61 of the camera apparatus 24 receives the camera apparatus information list transmitted from the camera apparatus 24, and supplies this to the priority determining unit 64. The priority determining unit 64 of the camera apparatus 21 then updates the priority list based on this camera apparatus information list.

Also, in step S88, the acquisition unit 61 of the camera apparatus 24 transmits the camera apparatus information list created in step S86 to the camera apparatus 22.

In step S62, the acquisition unit 61 of the camera apparatus 22 receives the camera apparatus information list transmitted from the camera apparatus 24, and supplies this to the priority determining unit 64. The priority determining unit 64 of the camera apparatus 22 then updates the priority list based on this camera apparatus information list.

Further, in step S89, the acquisition unit 61 of the camera apparatus 24 transmits the camera apparatus information list created in step S86 to the camera apparatus 23.

In step S72, the acquisition unit 61 of the camera apparatus 23 receives the camera apparatus information list transmitted from the camera apparatus 24, and supplies this to the priority determining unit 64. The priority determining unit 64 of the camera apparatus 23 then updates the priority list based on this camera apparatus information list.

FIG. 16 illustrates an example of a priority list. Note that FIG. 16 shows a priority list stored in the RAM 43 of the camera apparatus 24. As shown in FIG. 16, "TERMINAL LIST" is displayed at the highest row of the camera apparatus information list, indicating that this is a camera apparatus information list. Also displayed in the second row are "CAMERA4" indicating the ID "4" assigned to the camera apparatus 24 which is the camera apparatus itself, "XXX.XXX.XXX.004" which is the IP address of the camera apparatus 24, "L" which is the current priority data, "80" which is the radio wave intensity indicated by radio wave information, and "5.2" which is remaining capacity indicated by remaining capacity information.

Further, displayed in the third row are "CAMERA1" indicating the ID "1" assigned to the other camera apparatus 21, "XXX.XXX.XXX.001" which is the IP address of the camera apparatus 21, "L" which is the current priority data, "70" which is the radio wave intensity indicated by radio wave information, and "13.5" which is remaining capacity indicated by remaining capacity information.

In the same way, displayed in the fourth row are "CAMERA2" indicating the ID "2" assigned to the other camera apparatus 22, "XXX.XXX.XXX.002" which is the IP address of the camera apparatus 22, "H" which is the current priority data, "75" which is the radio wave intensity indicated by radio wave information, and "21" which is remaining capacity indicated by remaining capacity information, and displayed in the fifth row are "CAMERA3" indicating the ID "3" assigned to the camera apparatus 23, "XXX.XXX.XXX.003" which is the IP address of the camera apparatus 23, "L" which is the current priority data, "45" which is the radio wave intensity indicated by radio wave information, and "10.1" which is remaining capacity indicated by remaining capacity information.

Figure 17:
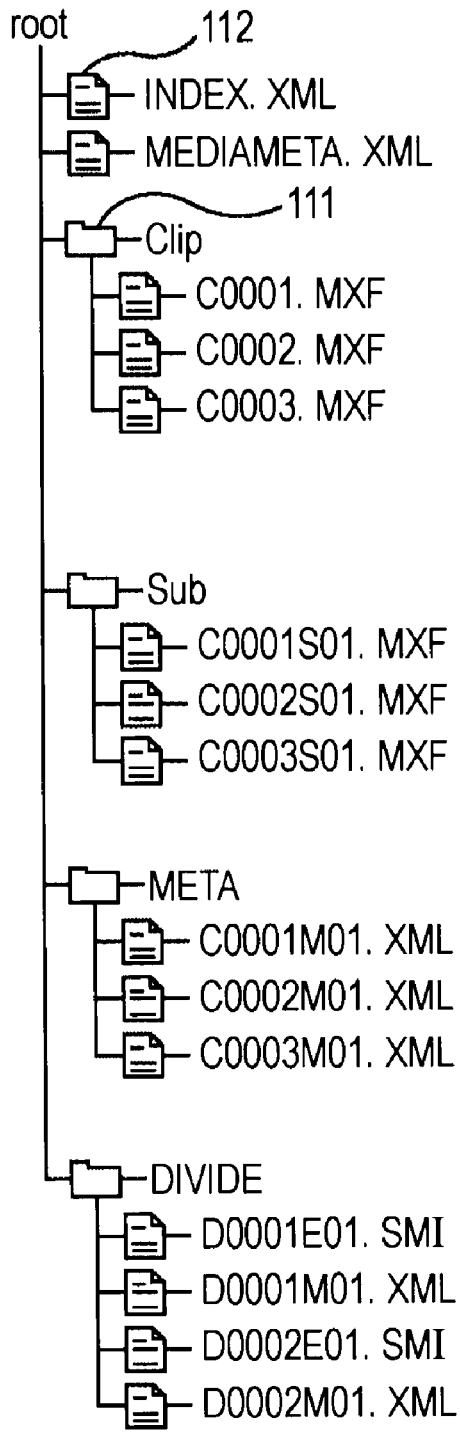
FIG. 17 is a diagram for describing the directory structure of a file recorded in a recording unit shown in FIG. 3.

Next, the directory structure of files recorded in the recoding unit 49 shown in FIG. 3 will be described with reference to FIG. 17. In FIG. 17, symbol 111 represents a single directory. Note that while not denoted with reference numerals, other symbols the same as the symbol (directory) 111 represent a single directory. Also, the symbol 112 denotes a single file. Note that while not denoted with reference numerals, other symbols the same as the symbol (file) 112 represent a single file. Unless stated otherwise, "directory" and "directory symbol" will be described as being the same. In the same way, "file" and "file symbol" will be described as being the same. In the following, "file" or "directory" will be followed by the name thereof in parentheses, to facilitate recognition of each file.

In the example in FIG. 17, provided to the recording unit 49 are an index file (INDEX.XML) 112 for describing information for managing clips and division information lists (details will be described later) which is a data file to describe an index, and a media metafile (MEDIAMETA.XML) which is a file of media metadata configured of a path of a representative image of the recording unit 49, title of the recording unit 49, comments, and so forth. Note that a division information list is a list indicating information relating to divided shot data in a case wherein shot data is divided and transferred to multiple camera apparatuses 20 by the transfer unit 67 shown in FIG. 4.

Also, provided to the recording unit 49 are a directory clip (Clip) 111 where, of clips, shot data files are provided at a lower order, a proxy directory (Sub) where, of clips, files of image proxy data which is low-resolution image data wherein the data amount of image data of shot data has been reduced and audio proxy data which is high-compression audio data wherein the data amount of audio data thereof has been reduced, are provided at a lower order, a meta directory (META) where files including metadata regarding which real-time nature is not demanded (hereinafter referred to as "non-real-time metadata") are provided at a lower order, and a division directory (DIVIDE) where files of a division information list are provided at a lower order.

The clip directory (Clip) 111 records, of the clips recorded in the recording unit 49, shot data, as different files for each clip. Specifically, for example, FIG. 17 shows an example of a case wherein shot data of three clips are recorded in the recording unit 49. That is to say, for example, a first clip file (C0001.MXF) which is a file of shot data of the first clip recorded in the recording unit 49, a second clip file (C0002.MXF) which is a file of shot data of the second clip, and a third clip file (C0003.MXF) which is a file of shot data of the third clip, are provided under the clip directory 111.

In FIG. 17, the proxy directory (Sub) shown below this clip directory records, of the clips recorded in the recording unit 49, proxy data of clips, as different files for each clip. For example, in the case in FIG. 17, a first proxy file (C0001S01.MXF) which is a file of proxy data of the first clip recorded in the recording unit 49, a second proxy file (C0002S01.MXF) which is a file of proxy data of the second clip, and a third proxy file (C0003S01.MXF) which is a file of proxy data of the third clip, are provided under the proxy directory (Sub).

Also, in FIG. 17, non-real-time metadata of clips recorded in the recording unit 49 are recorded in the meta directory (META) shown below the proxy directory (Sub), as different files for each clip. Note that camera apparatus identification information of a transfer destination camera apparatus 20 transferred by the transfer unit 67 in FIG. 4 for example, and so forth, are recorded as non-real-time metadata.

In the case in FIG. 17, a first non-real-time metadata file (C0001M01.XML) which is a file including non-real-time metadata of the first clip recorded in the recording unit 49, a second non-real-time metadata file (C0002M01.XML) which is a file including non-real-time metadata of the second clip, and a third non-real-time metadata file (C0003M01.XML) which is a file including non-real-time metadata of the third clip, are provided under the meta directory (META).

Also, in FIG. 17, division information lists of clips recorded in the recording unit 49 are recorded in the division directory (DIVIDE) shown below the meta directory (META), as different files for each clip. For example, in the case in FIG. 17, a first division information list file (D0001E01.SMI) which is a file including a division information list of the first clip recorded in the recording unit 49, and a first division information list metadata file (D0001M01.XML) which is a file including metadata of that division information list, are provided below the division directory (DIVIDE). Also, in the same way as with the first division information list file (D0001E01.SMI) and the first division information list metadata file (D0001M01.XML), a second division information list file (D0002E01.SMI) which is a file including a division information list of the second clip recorded in the recording unit 49, and a second division information list metadata file (D0002M01.XML) which is a file including metadata of that division information list, are provided. That is to say, with the example in FIG. 17, the shot data of the first clip and second clip recorded in the recording unit 49 is divided and transferred to multiple camera apparatuses 20.

FIG. 18 illustrates an example of non-real-time metadata of a clip of which the entirety has been transferred to one camera apparatus 20. That is to say, FIG. 18 is a diagram illustrating a specific description example of a non-real-time metadata file (FIG. 17) described in XML, of a clip of which the entirety has been transferred to one camera apparatus 20. In FIG. 18, the numerals at the head of each line have been added for convenience of description, and are not part of the XML description. This holds true for description of the later-described FIGS. 19 and 20 as well.

In a case of transferring shot data of a clip to one camera apparatus 20, non-real-time metadata is also transferred. This non-real-time metadata is not deleted from the transfer source camera apparatus 20, and remains there. Following transfer, the camera apparatus identification information of the transfer destination camera apparatus 20, and the date and time of transfer, are recorded in the non-real-time metadata.

In detail, the XML description of a non-real-time metadata file is primarily configured of a non-real-time meta portion within non-real-time meta tags (<NonRealTimeMeta></NonRealTimeMeta>). In the example in FIG. 18, the non-real-time meta portion is described in lines 2 through 13.

The camera apparatus identification information of the transfer destination camera apparatus 20 for the shot data of the clip, and so forth, are described in the non-real-time meta portion. Specifically, in FIG. 18, line 2 has information described indicating that this non-real-time metadata file is professional disc (professional Disc) non-real-time metadata (nonRealTimeMeta). Also, line 3 describes the date and time of the last update of the non-real-time metadata file (lastUpdate).

The TargetMaterial element in lines 4 through 6 describe a UMID assigned to the clip file corresponding to this non-real-time metadata file. That is to say, the description umidRef="060A2B340101010501010D12130000000000 001044444484EEE E00E0188E130B" in line 5 indicates that the UMID assigned to the clip file corresponding to this non-real-time metadata file is 060A2B34010 1010501010D1213000000000001044444484EEEE00E0 188E 130B.

Also, the status="OK" in line 6 indicates that the shot data can be used as television program data.

Described in the TransferMediaId element in line 7 is a unique ID assigned to the camera apparatus 20 as camera apparatus identification information of the transfer destination camera apparatus 20. That is to say, the value="20070101" in line 7 indicates that the ID assigned to the transfer destination camera apparatus 20 is 20070101.

Also, described in the TransferDate element in line 8 is the date and time of transfer. That is to say, the value="2007-08-01T14:12:56+09:00" in line 8 indicates that the date and time of transfer is nine minutes from 14:12 and 56 seconds on Aug. 1, 2007. Accordingly, non-real-time metadata files transferred to other camera apparatuses 20 do not include the description of lines 7 and 8.

Further, the Duration element in line 9 describes the number of frames of shot data of the clip file which corresponds to this non-real-time metadata file. That is to say, the value="9000" in line 9 indicates that the number of frames of shot data of the clip file which corresponds to this non-real-time metadata file is 9000 frames.

Also, the CreationDate element in line 10 describes the date and time of creation of the clip file which corresponds to this non-real-time metadata file. That is to say, the value="2007-08-01T12:34:56+09:00" indicates that the date and time of creation of the clip file which corresponds to this non-real-time metadata file is nine minutes from 12:34 and 56 seconds on Aug. 1, 2007.

Further, the Title element in line 11 describes the title of the clip file which corresponds to this non-real-time metadata file. That is to say, the usAscii="The Prime Minister organized a new Cabinet" in line 11 indicates that the title of the file which corresponds to this non-real-time metadata file is "The Prime Minister organized a new Cabinet".

FIG. 19 illustrates an example of non-real-time metadata of a clip which has been divided and transferred to multiple camera apparatuses 20. That is to say, FIG. 19 is a diagram illustrating a specific description example of a non-real-time metadata file (FIG. 17) described in XML, of a clip which has been divided and transferred to multiple camera apparatuses 20.

In the event of dividing shot data of a clip and transferring to multiple camera apparatuses 20 as well, as with the case of transferring all to one camera apparatus 20, non-real-time metadata is also transferred. This non-real-time metadata is not deleted from the transfer source camera apparatus 20, and remains there. Following transfer, the camera apparatus identification information of the transfer destination camera apparatuses 20, and the date and time of transfer, are recorded in the non-real-time metadata.

Note that the description in lines 1 through 6 and lines 9 through 13 in the non-real-time metadata in FIG. 19 are the same as the description of the lines 1 through 6 and lines 9 through 13 in the non-real-time metadata in FIG. 18, and accordingly description thereof will be omitted.

In FIG. 19, The Divide element in line 7 describes the UMID assigned to the division information list file corresponding to the non-real-time metadata file. That is to say, the description umidRef="060A2B340101010501010D1213 000000524728714444484EEE E00E0188E130B" in line 7 indicates that the UMID assigned to the division information list file corresponding to the non-real-time metadata file is 060A2B340101010501010D121300000052472871444444 84EEEE00E0188E 130B.

FIG. 20 shows an example of a division information list. That is to say, FIG. 20 is a diagram illustrating a specific description example of a division information list file (FIG. 17) described in XML. A division information list file is a file including camera apparatus identification information of transfer destination camera apparatuses 20 to which the divided clip file has been transferred, and also describes how to play the clip file as well.

As shown in FIG. 20, the XML description of a division information list file is primarily configured of the body portion between the body tags (<body></body>). In the example shown in FIG. 20, the body portion is described in lines 4 through 17. Note that line 2 describes that this file is a division information list file (Divide-Editlist). Also, line 3 describes the UMID 060A2B340101010501010D1213000000 5247287144444484EEEE00E0188E 130B assigned to this division information list file.

The body portion describes the information relating to the temporal behavior of the description. In the example in FIG. 20, the par elements described between the start tag <par> in line 5 and the end tag </par> in line 16 define a simple time group wherein multiple elements are played at the same time.

In the example in FIG. 20, the first divided clip file (described as Cut 1 in the example in FIG. 20) which is one of the clip file that has been divided into two, and the second divided clip file (described as Cut 2 in the example in FIG. 20) which is the other of the clip file that has been divided into two, are described as being played at the same time. However, it should be noted that with the case in FIG. 20, the playing start times of the two divided clip files are offset, so actually the two divided clip files are played consecutively.

Specifically, in FIG. 20, camera apparatus identification information of the camera apparatus 20 where the first divided clip files has been recorded is described in the TransferMediaId element in line 7. That is to say, the value="20070101" in line 7 indicates that the unique ID assigned to the camera apparatus 20 where the first divided clip file has been recorded is 20070101.

Also, the video element in lines 8 through 10 describes the clip file referenced and playing range of the clip file and so forth. Specifically, the description in line 9 umid="060A2B340101010501010D121300000033516511 44444484EEEE00E0188E9315" indicates that the UMID assigned to the first divided clip file is 060A2B 340101010501010D121300000033516511444444484EEEE 00E0188E 9315.

Also, the description clipBegin="0" in line 10 indicates the position for starting playing of the first divided clip file in terms of the FTC (Frame Time Code) of the first divided clip file, in increments of frames. Note that FTC is absolute positional information assigned to each frame, in order from the head frame.

The description clipEnd="5999" in line 10 indicates the position for ending playing of the first divided clip file in terms of FTC of the first divided clip file. Further, the description begin="0" in line 10 following that description indicates the time at which the first divided clip file is to start in terms of FTC of the clip file prior to division, in increments of frames. Also, the description end="5999" in line 10 indicates the time at which the first divided clip file is to end in terms of FTC of the clip file prior to division. Thus, with the example in FIG. 20, the division information list describes that the first divided clip file is to be played from the position of frame No. "0" at time "0", to the position of frame No. "5999".

In the same way as with the first divided clip file, lines 12 through 15 describe the second divided clip file. With the example in FIG. 20, the division information list describes that the second divided clip file is to be played from the position of frame No. "0" at time "6000", to the position of frame No. "2999".

The division information list in FIG. 20 specifies that playing of the first divided clip file and playing of the second divided clip file is to be performed at the same time, by the par elements. Accordingly, the first divided clip file is played from the position of frame No. "0" to the position of frame No. "5999", from time "0" to time "5999". Next, at time "6000", the second divided clip file is played from the position of frame No. "0" to the position of frame No. "2999". Thus, the division information list in FIG. 20 indicates that the clip file before division is played by the first divided clip file and the second divided clip file being played consecutively.

While examples of UMIDs of the files have been described with FIGS. 18 through 20, it should be noted that these only indicate the position where UMIDs are situated and so forth, and that these are imaginary UMIDs which have no meaning to the values thereof. That is to say, the UMIDs in FIGS. 18 through 20 are meaningless combinations of symbols that have nothing to do with actual UMIDs, and in practice, valid UMIDs created as stipulated by the SMPTE will be described at each position instead of the imaginary UMIDs.

Next, transfer processing performed by the CPU 41 shown in FIG. 4 will be described with reference to FIG. 21. This transfer processing is started when a new clip file is recorded in the recording unit 49 (FIG. 3), for example.

In step S101, the recording control unit 65 detects the remaining capacity of the recording unit 49, and determines whether or not the remaining capacity is below the remaining capacity stipulation value of itself.

In the event that determination is made in step S101 that the remaining capacity of the recording unit 49 is below the remaining capacity stipulation value of itself, in step S102 the transfer unit 67 compares the remaining capacity of the other camera apparatuses 20 with the remaining capacity stipulation values corresponding to the priority data of the camera apparatuses 20, based on the priority list recorded in the RAM 43.

In step S103, the transfer unit 67 determines whether or not there are any of the other camera apparatuses 20 wherein the remaining capacity exceeds the remaining capacity stipulation value, based on the results of comparison in step S102.

In the event that determination is made in step S103 that there is another camera apparatus 20 wherein the remaining capacity exceeds the remaining capacity stipulation value, in step S104 the CPU 41 performs shot data transfer processing for transferring the shot data to the camera apparatus 20 where the remaining capacity exceeds the remaining capacity stipulation value. Details of this shot data transfer processing will be described later with reference to FIG. 22.

On the other hand, in the event that determination is not made in step S101 that the remaining capacity of the recording unit 49 is below the remaining capacity stipulation value of itself, the shot data recorded in the recording unit 49 does not have to be transferred, so the processing ends.

Also, in the event that determination is not made in step S103 that there are camera apparatuses 20 wherein the remaining capacity exceeds the remaining capacity stipulation value, there is no destination where the shot data recorded in the recording unit 49 can be transferred, so the processing ends.

Next, the shot data transfer processing of step S104 in FIG. 21 will be described with reference to FIG. 22.

In step S120, the transfer destination determining unit 66 decides a clip file to transfer. For example, the transfer destination determining unit 66 decides that the clip file recorded in the recording unit 49 last is to be transferred. The transfer destination determining unit 66 then supplies the UMID assigned to the clip file to be transferred to the transfer unit 67 as transfer object identification information.

In step S121, the CPU 41 performs transfer destination deciding processing for deciding a transfer destination. Details of this transfer destination deciding processing will be described later with reference to FIG. 23.

In step S122, the transfer unit 67 determines whether or not the number of camera apparatuses 20 decided in the transfer destination deciding processing in step S121 is one.

In the event that determination is not made in step S122 that the number of camera apparatuses 20 is one, i.e., in the event that there are multiple transfer destination camera apparatuses 20, in step S123 the transfer unit 67 divides the clip file to be transferred to each transfer destination, in order from the transfer destination with the greatest remaining capacity, based on the camera apparatus identification information and transfer object identification information supplied from the transfer destination determining unit 66, and the priority list stored in the RAM 43, and assigns UMIDs to each of the divided clip files following division. For example, in the event that the transfer destinations are three camera apparatuses 21 through 23, and the remaining capacities of the camera apparatuses 21 through 23 are 600 MB, 300 MB, and 200 MB respectively, the transfer unit 67 will divide a 1,000 MB clip file into a 600 MB divided clip file for the camera apparatus 21, a 300 MB divided clip file for the camera apparatus 22, and a 100 MB divided clip file for the camera apparatus 23.

In step S124, the transfer unit 67 transfers the divided clip files for each transfer destination to each transfer destination camera apparatus 20.

In step S125, the transfer unit 67 deletes the clip file for transfer from the recording unit 49, and records the UMID of the division information list file describing the division information list of the divided clip files divided in step S123, in the non-real-time metadata file corresponding to that clip file.

In step S126, the transfer unit 67 creates a division information list of the divided clip files divided in step S123, and records this as a division information list file corresponding to the clip file for transfer, in the recording unit. The flow then returns to step S104 in FIG. 21.

On the other hand, in the event that determination is made in step S122 that the number of transfer destination camera apparatuses 20 is one, in step S127 the transfer unit 67 transfers the clip file for transfer to the transfer destination camera apparatus 20, based on the camera apparatus identification information and transfer object identification information supplied from the transfer destination determining unit 66.

In step S128, the transfer unit 67 deletes the clip file for transfer from the recording unit 49, and records the camera apparatus identification of the transfer destination camera apparatus 20 and so forth in the non-real-time metadata file corresponding to that clip file. The flow then returns to step S104 in FIG. 21.

As described above, with the recording system 10, at the time of a camera apparatus 20 transferring a clip file to another camera apparatus 20, the clip file is deleted, but the proxy file, metadata file, and division information list file are not deleted, so the user using the transfer source camera apparatus 20 can continue to recognize the contents of the clip file even after transfer of the clip file using these files.

Next, the details of transfer destination deciding processing in step S121 in FIG. 22 will be described with reference to FIG. 23.

Figure 21:
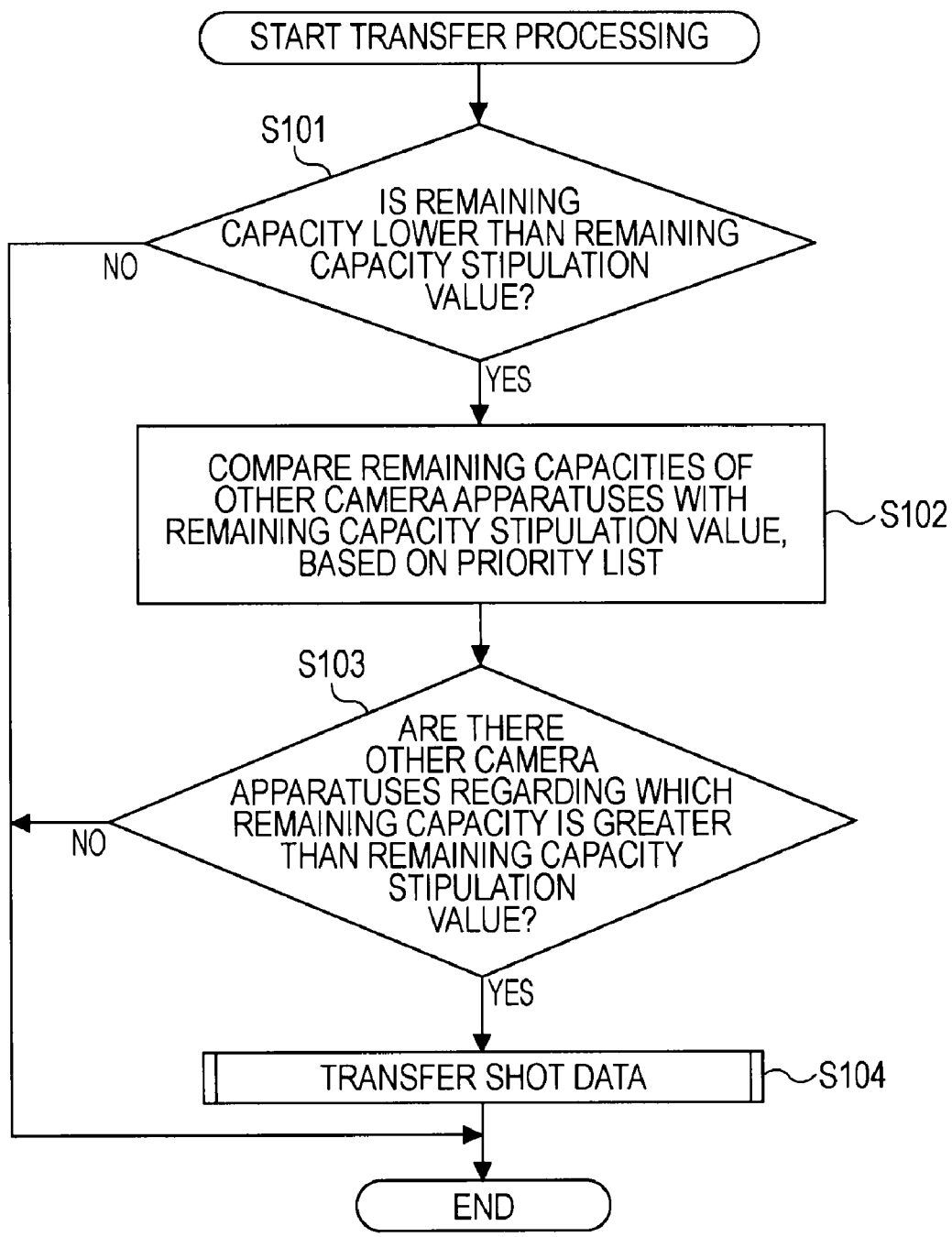
FIG. 21 is a flowchart for explaining transfer processing performed by the transfer unit shown in FIG. 4.

In step S141, the transfer destination determining unit 66 selects, of the other camera apparatuses 20 which have not yet been decided as transfer destinations and which have been determined to have remaining capacity exceeding the remaining capacity stipulation value in step S103 in FIG. 21, those which have priority data of "L" and radio wave intensity of "50" or stronger.

In step S142, the transfer destination determining unit 66 performs communication with the camera apparatus 20 selected in step S141 which has the greatest remaining capacity, and obtains radio wave information.

In step S143, the transfer destination determining unit 66 determines whether or not the radio wave information obtained in step S142 is intensity of "50" or stronger.

In the event that determination is made in step S143 that the radio wave intensity is "50" or stronger, in step S144 the transfer destination determining unit 66 decides the camera apparatus 20 selected in step S141 to be the transfer destination. The transfer destination determining unit 66 then supplies the camera apparatus identification information of the camera apparatus 20 decided as the transfer destination to the transfer unit 67.

In step S145, the transfer destination determining unit 66 determines whether or not the remaining capacity of the camera apparatus 20 decided as the transfer destination is sufficient, based on the size of the clip file that has been decided to be transferred in step S120, i.e., whether the remaining capacity of the camera apparatus 20 decided as the transfer destination is equal to or greater than the size of the clip file to be transferred.

Figure 22:
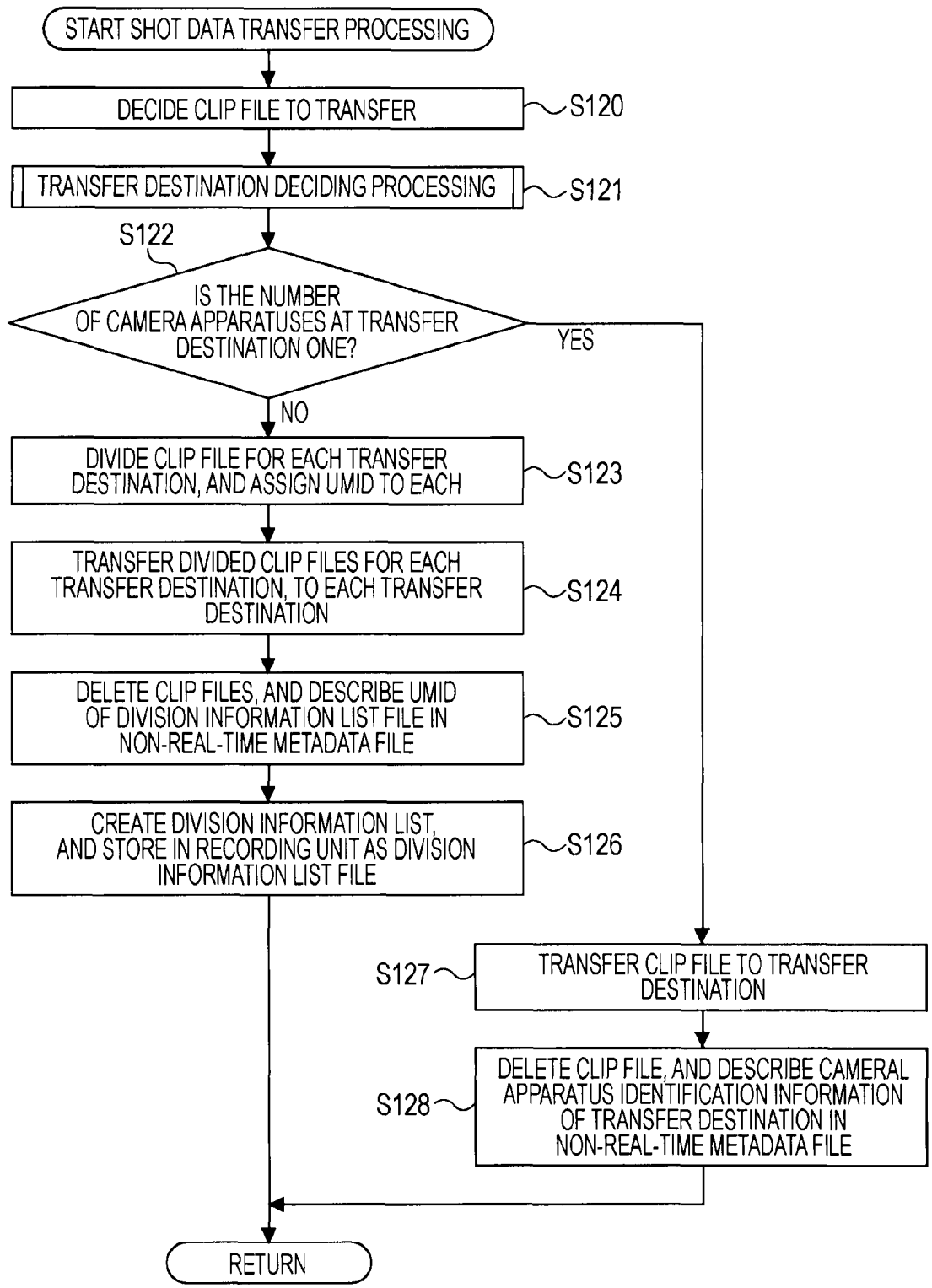
FIG. 22 is a flowchart for explaining detailed shot data transfer processing performed in step S104 in FIG. 21.
Figure 23:
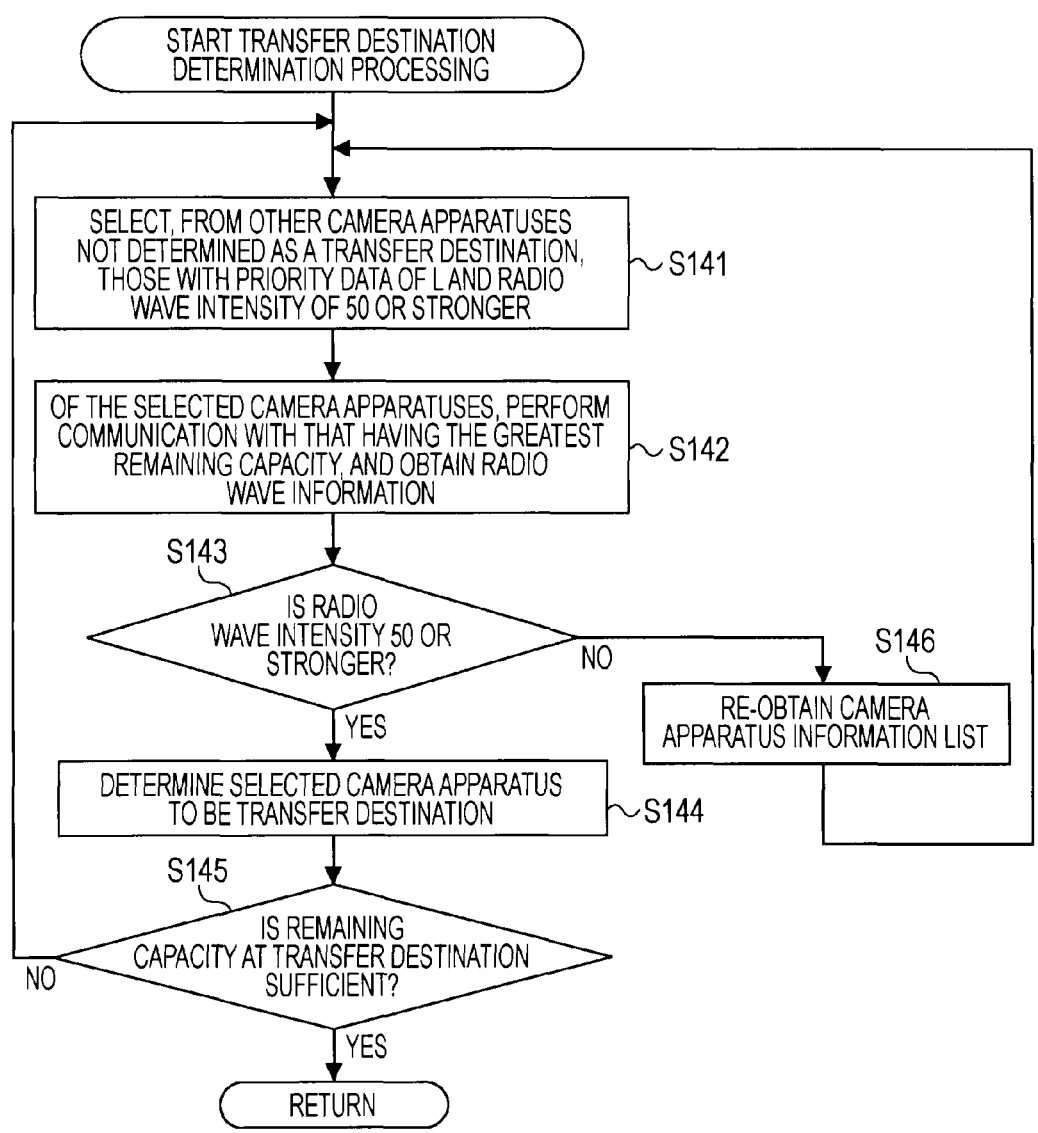
FIG. 23 is a flowchart for explaining detailed transfer destination determining processing performed in step S121 in FIG. 22.

In the event that determination is made in step S145 that the remaining capacity of the camera apparatus 20 decided as the transfer destination is sufficient, the flow returns to step S121 in FIG. 22.

On the other hand, in the event that determination is not made in step S145 that the remaining capacity of the camera apparatus 20 decided as the transfer destination is sufficient, the flow returns to step S141, and the above processing is repeated. Accordingly, new transfer destinations are decided and added until the total remaining capacity of all transfer destinations is equal to or greater than the size of the clip file to be transferred.

Also, in the event that determination is not made in step S143 that the radio wave intensity is "50" or stronger, in step S146 the acquisition unit 61 re-obtains the camera apparatus information list, and supplies to the priority determining unit 64. The priority determining unit 64 then updates the priority list based on the camera apparatus information list, the flow returns to step S141, and the above-described processing is repeated.

As described above, with the recording system 10, the remaining capacity stipulation value is set such that a remaining capacity stipulation value corresponding to priority data of which the priority is not highest priority is smaller than a remaining capacity stipulation value corresponding to highest priority data, and a clip file is transferred in the event that the remaining capacity of the recording unit 49 falls below the remaining capacity stipulation value. Accordingly, clip files can be transferred with priority from a camera apparatus 20 regarding which highest priority data has been set, as compared to a camera apparatus 20 regarding which priority data of which the priority is not highest priority has been set. Consequently, of multiple camera apparatuses 20 connected via the wireless network 25, the camera apparatus 20 regarding which highest priority data has been set can perform shooting for a long time.

Also, with the recording system 10, the camera apparatus 20 regarding which highest priority data has been set is not selected as a transfer destination, so the camera apparatus 20 regarding which highest priority data has been set does not record shot data of other camera apparatuses 20 even if the remaining capacity exceeds the remaining capacity stipulation value. Accordingly, the camera apparatus 20 regarding which highest priority data has been set can continually have remaining capacity of as large as possible, and can shoot for a long time.

Accordingly, with the recording system 10, the cameraman can set highest priority data for the camera apparatus 20 which he/she is to use, thereby enabling the cameraman leading the recording operation to perform shooting for a long time, or a cameraman at a vantage point to perform shooting for a long time, and so on.

Figure 24:
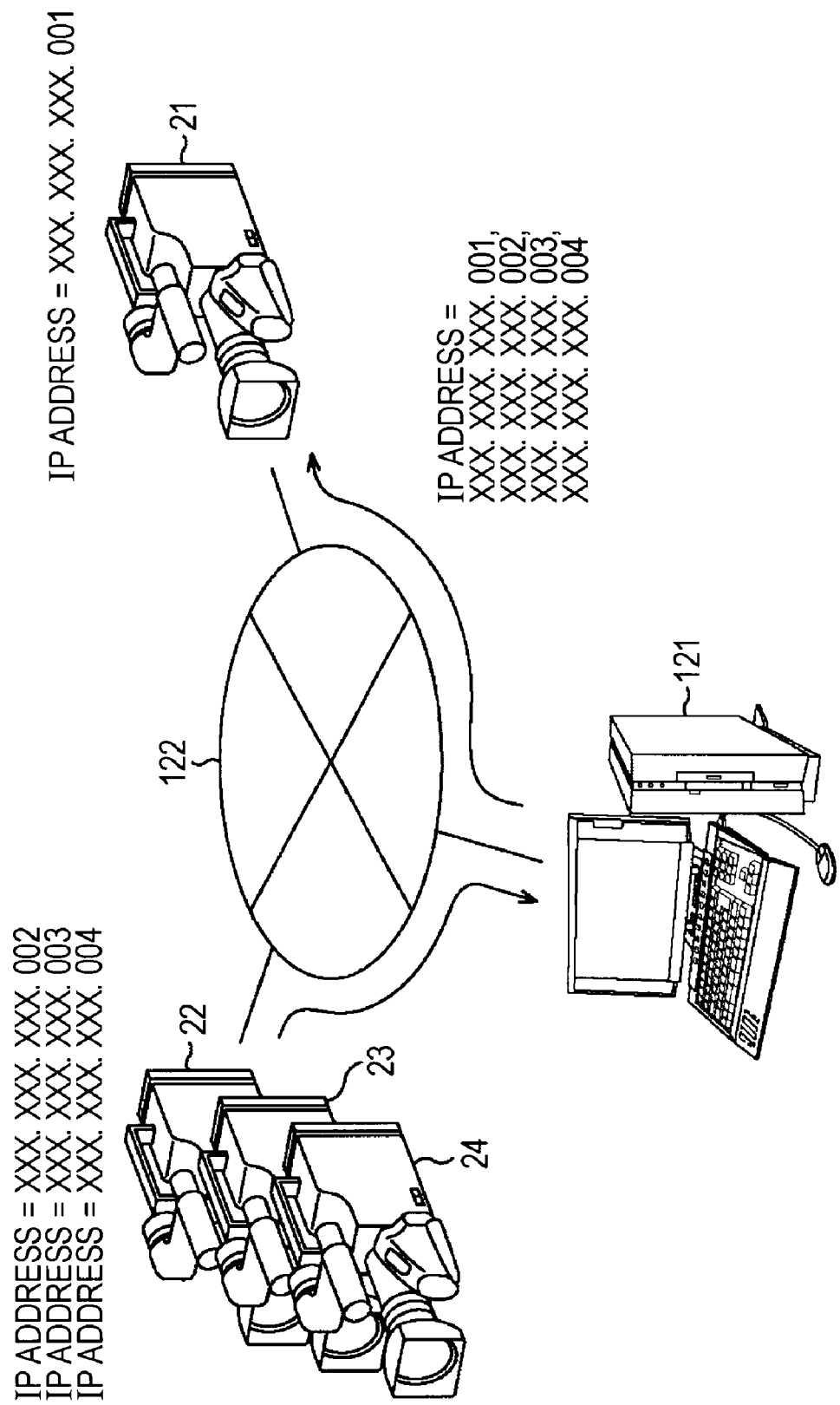
FIG. 24 is a diagram for explaining an obtaining method for authentication information of a camera apparatus.

Next, the way in which the camera apparatus 20 obtains authentication information will be described with reference to FIG. 24. As shown in FIG. 24, the camera apparatuses 21 through 24, which may connect to the wireless network 25, each connect to a network 122 to which a host computer 121 managing authentication information is connected.

Each camera apparatus 20 transmits authentication information such as its own IP address or the like to the host computer 121 via the network 122, in accordance with SMTP (Simple Mail Transfer Protocol) or the like. In the example in FIG. 24, for example, the camera apparatus 21 transmits an IP address "XXX.XXX.XXX.001", the camera apparatus 22 transmits an IP address "XXX.XXX.XXX.002", the camera apparatus 23 transmits an IP address "XXX.XXX.XXX.003", and the camera apparatus 24 transmits an IP address "XXX.XXX.XXX.004".

The host computer 121 manages the authentication information transmitted from the camera apparatuses 20. Specifically, the host computer 121 stores the authentication information transmitted from the camera apparatuses 20. The host computer 121 also transmits all authentication information stored therein via the network 122 to a camera apparatus 20 which has transmitted authentication information thereto, in accordance with FTP (File Transfer Protocol) or the like. In the example in FIG. 24, the host computer transmits the IP address "XXX.XXX.XXX.001" of the camera apparatus 21, the IP address "XXX.XXX.XXX.002" of the camera apparatus 22, the IP address "XXX.XXX.XXX.003" of the camera apparatus 23, and the IP address "XXX.XXX.XXX.004" of the camera apparatus 24, to the camera apparatuses 21 through 24. Each camera apparatus 20 obtains and stores the authentication information of the camera apparatuses 21 through 24 which may connect to the wireless network 25.

Note that while an IP address is displayed on the priority screen 91 (101) in the above description, an IP address does not have to be displayed.

While description has been made above that the shot data is recorded in the recording unit 49 and then transferred, an arrangement may be made wherein the shot data that has been acquired by the shooting unit 46 is transferred as it is.

Also, while description has been made above that priority data is determined based on highest priority information, arrangements may be made wherein the priority data is determined based on the radio wave information of the camera apparatuses 20, or the priority data is determined based on the remaining capacity information. In this case, priority data is set such that the stronger the radio wave intensity, the higher the priority is, or the greater the remaining capacity, the higher the priority is.

Also, an arrangement may be made wherein importance is set by the user for each clip file recorded in the recording unit 49, with priority data being determined based on the number of clip files set to low importance. For example, in the event that the user sets one or the other of high importance and low importance, the camera apparatus 20 assigns an NG attribute to a clip file set with low importance, and determines the priority data based on the number of clip files recorded in the camera apparatuses 20 to which the NG attribute has been assigned.

Further, in a case of the user setting importance for each clip file recorded in the recording unit 49, in the event that determination is not made in step S103 in FIG. 21 that there is another camera apparatus 20 of which the remaining capacity exceeds the remaining capacity stipulation value, the camera apparatus 20 may delete the clip files with low importance set out of the clip files recorded in its own recording unit 49, such that the remaining capacity exceeds the remaining capacity stipulation value.

Also, the camera apparatus 20 may overwrite a clip file recorded in its own recording unit 49 over clip files set with low importance in all or part of the camera apparatuses 20, and delete this from its own recording unit 49, such that the remaining capacity exceeds the remaining capacity stipulation value.

In this case, the transfer source camera apparatus 20 may delete only the clip file transferred to another camera apparatus 20 and retain the proxy file and non-real-time metadata file. Also, in this case, though not shown in the drawings, information may be described in the non-real-time metadata file retained at the camera apparatus 20 following transfer, indicating that the corresponding clip file has been deleted.

Also, while description has been made above that highest priority request information is transmitted from a single camera apparatus 20, an arrangement may be made wherein this is transmitted from multiple camera apparatuses 20. In this case, there are multiple camera apparatuses 20 where highest priority data are set.

Further, a camera apparatus 20 does not necessarily have to include a shooting unit 46, and may acquire shot data from an externally-provided shooting unit and record this.

In the present Specification, the steps describing the programs stored in the program recording medium may of course be executed in the time-sequence according to the order described, but are not restricted to being executed in time-sequence, and may be executed in parallel or individually.

Note that in the present Specification, the term "system" refers to the entirety of equipment configured of multiple devices.

Further, embodiments of the present invention are not restricted to the above embodiment, and various modifications may be made without departing from the essence of the invention. It should be understood by those skilled in the art that various modifications, combinations, sub-combinations and alterations may occur depending on design requirements and other factors insofar as they are within the scope of the appended claims or the equivalents thereof.

What is claimed is:

1. A video camera connected to at least one other video camera via a network, said video camera comprising:
   an acquisition unit configured to acquire data;
   a recording unit configured to record said data;
   a transmission unit configured to transmit, to said other video camera, priority information which is information relating to priority data representing priority of recording said data to said other video camera;
a reception unit configured to receive other priority information which is information relating to priority data representing priority of recording data acquired at said other video camera in said video camera, which is transmitted from said other video camera;
a determination unit configured to determine priority data of said video camera and said other video camera, based on said priority information and said other priority information; and
a transfer unit configured to transfer said data, after said data has been recorded by said recording unit, to said other video camera, based on the priority data of said other video camera, in the event that the recording capacity of said recording unit falls below a stipulation value corresponding to the priority data of said video camera, wherein
the transfer unit deletes said data from said recording unit after and in response to said transfer unit transferring said data to said other video camera,
said data is data acquired by shooting, and
said recording unit records said data in increments of clips, which together is a collection of shot data obtained by one shooting process.

2. The video camera according to claim 1, wherein one of said priority information and said other priority information is information representing a request for highest priority data, and the other is information representing acknowledgement of changing priority data in accordance with said request.

3. The video camera according to claim 1, wherein:
said priority information is information representing the number of clips recorded in said recording unit of which importance is low; and
said other priority information is information representing the number of clips recorded in said other recording unit of which importance is low.

4. The video camera according to claim 1, wherein:
priority information is information representing the remaining capacity of said recording unit; and
said other priority information is information representing the remaining capacity of said other recording unit.

5. The video camera according to claim 1, wherein:
said network is a wireless network;
said priority information is the intensity of radio waves at said video camera; and
said other priority information is the intensity of radio waves at said other video camera.

6. The video camera according to claim 1, wherein, when not all of said clips of said data are recorded in said other video camera, said transfer unit divides a part of said data and transfers this to said other video camera as a file, and also assigns the file unique information which is information unique to that file, creates a division information list relating to and organizing said data following division including the unique information thereof, and records said division information list in said recording unit.

7. The video camera according to claim 1, wherein:
said data is configured of: image data, audio data, image proxy data wherein the data amount of said image data has been reduced, audio proxy data wherein the data amount of said audio data has been reduced, and metadata.

8. The video camera according to claim 7, wherein, in the event of transferring said data to said other video camera, said transfer unit describes information identifying said other video camera, which is a transfer destination, in metadata recorded in said recording unit.

9. A recording method for a video camera having a recording unit for recording data, and connected to at least one other video camera via a network, said method comprising:
acquiring data;
recording said data in said recording unit;
transmitting, to said other video camera, priority information which is information relating to priority data representing priority of recording said data to said other video camera;
receiving other priority information which is information relating to priority data representing priority of recording data acquired at said other video camera in said video camera, which is transmitted from said other video camera;
determining priority data of said video camera and said other video camera, based on said priority information and said other priority information; and
transferring said data, after said data has been recorded in said recording unit, to said other video camera, based on the priority data of said other video camera, in the event that the recording capacity of said recording unit falls below a stipulation value corresponding to the priority data of said video camera, wherein
said data is deleted from said recording unit after and in response to said transferring said data to said other video camera,
said data is data acquired by shooting, and
said recording unit records said data in increments of clips, which together is a collection of shot data obtained by one shooting process.

10. A non-transitory computer readable medium including a program for causing a processor to execute a method of transfer processing for transferring data from a video camera to at least one other video camera connected via a network, said method comprising:
acquiring data;
recording said data in a recording unit;
transmitting, to said other video camera, priority information which is information relating to priority data representing priority of recording said data to said other video camera;
receiving other priority information which is information relating to priority data representing priority of recording data acquired at said other video camera in said video camera, which is transmitted from said other video camera;
determining priority data of said video camera and said other video camera, based on said priority information and said other priority information; and
transferring said data, after said data has been recorded in said recording unit, to said other video camera, based on the priority data of said other video camera, in the event that the recording capacity of said recording unit falls below a stipulation value corresponding to the priority data of said video camera, wherein
said data is deleted from said recording unit after and in response to said transferring said data to said other video camera,
said data is data acquired by shooting, and
said recording unit records said data in increments of clips, which together is a collection of shot data obtained by one shooting process.

11. A recording system comprising:
a first video camera and a second video camera connected via a network, said first video camera including:
- a first acquisition unit configured to acquire first data,
- a first recording unit configured to record said first data,
- a first transmission unit configured to transmit, to said second video camera, first priority information which is information relating to priority data representing priority of recording said first data to said second video camera,
- a first reception unit configured to receive second priority information which is information relating to priority data representing priority of recording second data acquired at said second video camera in said first video camera, which is transmitted from said second video camera,
- a determination unit configured to determine priority data of said first video camera and said second video camera, based on said first priority information and said second priority information, and
- a transfer unit configured to transfer said first data, after said first data has been recorded by said first recording unit, to said second video camera, based on the priority data of said second video camera, in the event that the recording capacity of said first recording unit falls below a stipulation value corresponding to the priority data of said first video camera; and said second recording apparatus video camera including:
- a second acquisition unit configured to acquire said second data,
- a second recording unit configured to record said second data,
- a second reception unit configured to receive said first priority information transmitted from said first transmission unit,
- a second transmission unit configured to transmit said second priority information to said first reception unit, and
- a data reception unit configured to receive said first data transferred from said transfer unit, wherein said second recording unit records said first data received by said data reception unit, said first data is deleted from said first recording unit after and in response to said transferring said first data to said second video camera, said data is data acquired by shooting, and said recording unit records said data in increments of clips, which together is a collection of shot data obtained by one shooting process.

* * * * *